(12) United States Patent
Lee et al.

(10) Patent No.: US 11,989,337 B2
(45) Date of Patent: May 21, 2024

(54) ELECTRONIC DEVICE CONTROLLING ATTRIBUTE OF OBJECT ON BASIS OF USER'S MOTION, AND CONTROL METHOD THEREFOR

(71) Applicant: Samsung Electronics Co., Ltd., Gyeonggi-do (KR)

(72) Inventors: Sukjae Lee, Gyeonggi-do (KR); Jongjin Kim, Gyeonggi-do (KR); Jonghwan Shin, Gyeonggi-do (KR); Junhee Cho, Gyeonggi-do (KR); Jeongmin Park, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 17/476,588

(22) Filed: Sep. 16, 2021

(65) Prior Publication Data
US 2022/0004252 A1   Jan. 6, 2022

Related U.S. Application Data

(63) Continuation of application No. PCT/KR2020/003609, filed on Mar. 16, 2020.

(30) Foreign Application Priority Data

Mar. 20, 2019  (KR) .................... 10-2019-0032011

(51) Int. Cl.
*G06F 3/01*    (2006.01)
*G06F 3/00*    (2006.01)
(Continued)

(52) U.S. Cl.
CPC .............. *G06F 3/011* (2013.01); *G06F 3/005* (2013.01); *G06F 3/14* (2013.01); *G06F 3/167* (2013.01);
(Continued)

(58) Field of Classification Search
None
See application file for complete search history.

(56) References Cited

U.S. PATENT DOCUMENTS 8,209,635 B2 *   6/2012   Thom .................. G06F 1/1686
                                                        715/788
9,774,911 B1 *   9/2017   Thomas ................. G10L 25/51
(Continued)

FOREIGN PATENT DOCUMENTS

JP      2015-56019 A      3/2015
JP      2017-97411 A      6/2017
(Continued)

OTHER PUBLICATIONS

Korean Examination Report dated Jul. 18, 2023.
Korean Decision to Grant dated Jan. 5, 2024.

*Primary Examiner* — Christopher J Fibbi
(74) *Attorney, Agent, or Firm* — Cha & Reiter, LLC

(57) ABSTRACT

An electronic device and method are disclosed. The device implements the method, including: receiving an utterance using a microphone, obtaining an image using a camera, transmitting by communication circuitry the utterance and/or the image to a server, receiving from the server operational information based on the transmission, executing a task corresponding to the received operational information, wherein the operational information further causes display of a first screen including first objects at a first size, and a change of the first screen to a second screen, based on a user movement indicated in the first image, the second screen including second objects displayed at a second size different from the first size, and having a count different from a count of the first objects.

14 Claims, 24 Drawing Sheets

(51) Int. Cl.
*G06F 3/14* (2006.01)
*G06F 3/16* (2006.01)
*G06T 7/50* (2017.01)
*H04N 21/422* (2011.01)
*H04N 21/431* (2011.01)

(52) U.S. Cl.
CPC ......... *G06T 7/50* (2017.01); *H04N 21/42203* (2013.01); *H04N 21/4312* (2013.01); *G06T 2207/30196* (2013.01)

(56) References Cited

U.S. PATENT DOCUMENTS

| | | | |
|---|---|---|---|
| 10,360,876 B1* | 7/2019 | Rahman | G09G 5/14 |
| 11,113,552 B2 | 9/2021 | Ha | |
| 2011/0193933 A1 | 8/2011 | Ryu et al. | |
| 2012/0057794 A1* | 3/2012 | Tsurumi | G06F 3/011 382/195 |
| 2012/0124525 A1 | 5/2012 | Kang | |
| 2014/0232648 A1 | 8/2014 | Park et al. | |
| 2015/0012280 A1 | 1/2015 | Shin et al. | |
| 2015/0135090 A1 | 5/2015 | Park | |
| 2015/0198940 A1 | 7/2015 | Hwang et al. | |
| 2016/0313963 A1 | 10/2016 | Kang et al. | |
| 2017/0160911 A1 | 6/2017 | Ho et al. | |
| 2017/0262961 A1* | 9/2017 | Ekambaram | G09G 5/346 |
| 2018/0196782 A1* | 7/2018 | Gray | G06F 3/167 |
| 2019/0014408 A1* | 1/2019 | Tang | H04N 7/181 |
| 2019/0187870 A1* | 6/2019 | Bostick | G06V 40/174 |
| 2019/0237078 A1 | 8/2019 | Park | |
| 2020/0043488 A1 | 2/2020 | Park | |

FOREIGN PATENT DOCUMENTS

| | | |
|---|---|---|
| KR | 10-2012-0045392 A | 5/2012 |
| KR | 10-2012-0051209 A | 5/2012 |
| KR | 10-2013-0041537 A | 4/2013 |
| KR | 10-2015-0004122 A | 1/2015 |
| KR | 10-2015-0054156 A | 5/2015 |
| KR | 10-2015-0083677 A | 7/2015 |
| KR | 10-2016-0125190 A | 10/2016 |
| KR | 10-2017-0065902 A | 6/2017 |
| KR | 10-1769704 B1 | 8/2017 |
| KR | 10-2018-0061835 A | 6/2018 |
| KR | 10-2018-0084303 A | 7/2018 |
| KR | 10-2019-0024190 A | 3/2019 |
| KR | 10-2019-0024919 A | 3/2019 |

* cited by examiner

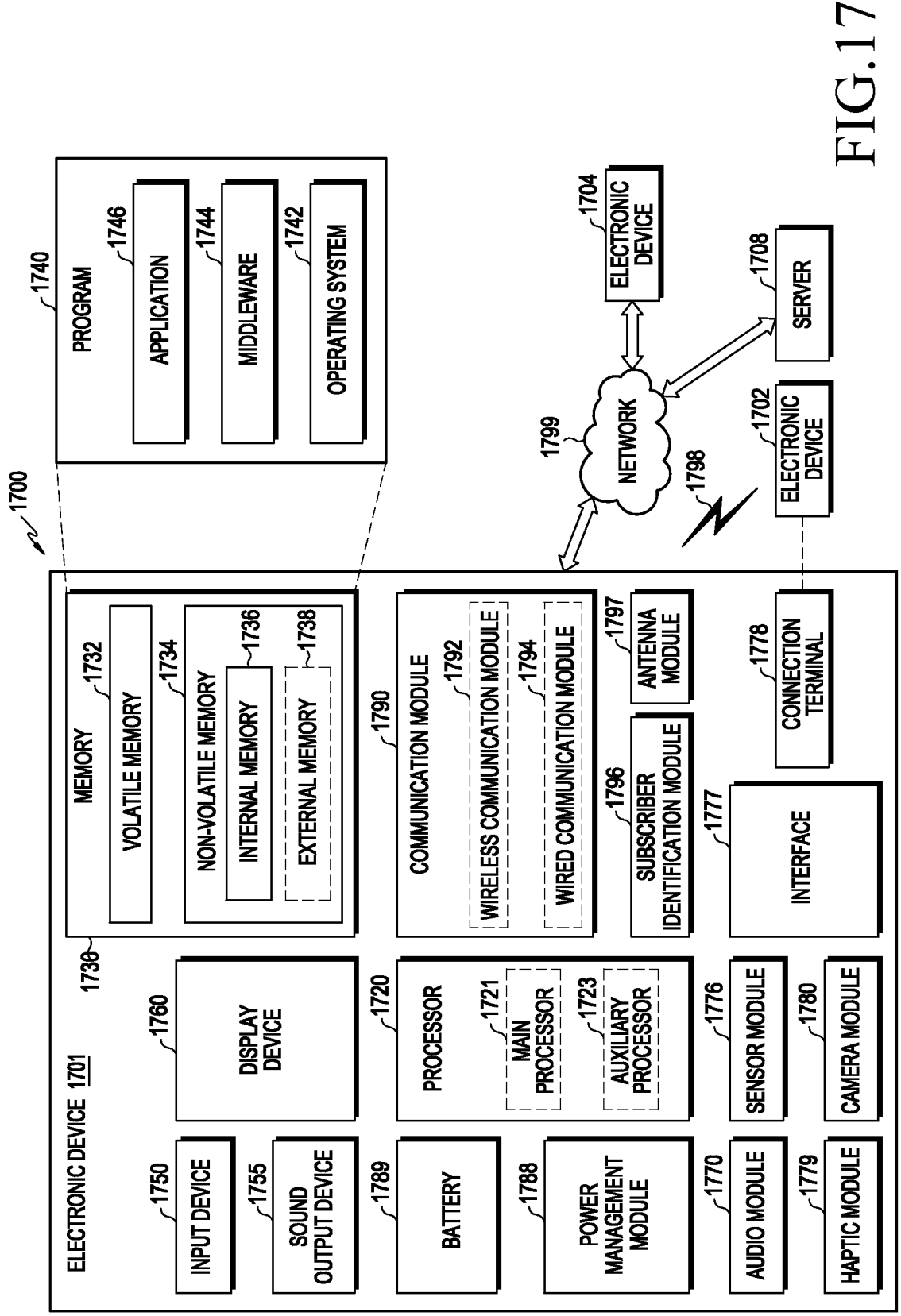

ELECTRONIC DEVICE CONTROLLING ATTRIBUTE OF OBJECT ON BASIS OF USER'S MOTION, AND CONTROL METHOD THEREFOR

CROSS-REFERENCE TO RELATED APPLICATION(S)

This application is continuation of International Application No. PCT/KR2020/003609, filed on Mar. 16, 2020, which claims priority to Korean Patent Application No. 10-2019-0032011 filed on Mar. 20, 2019 in the Korean Intellectual Property Office, the disclosures of which are herein incorporated by reference.

BACKGROUND

1. Field

Certain embodiments of the disclosure relate to an electronic device for controlling a characteristic of an object based on movement of a user, and a control method thereof.

2. Description of the Related Art

The diversity of services and functions provided through an electronic devices have gradually increased. Such devices often include displays, which may be implemented as curved displays, cylindrical displays, or displays having various polygonal pillar shapes, as well as a more general flat display. In order to increase the usefulness of such electronic devices and satisfy the needs of users, communication service providers and/or electronic device manufacturers have competitively developed electronic devices to provide even more functions, seeking to differentiate their offerings from those other companies. Accordingly, various functions provided through the electronic devices have advanced in utility and sophistication.

SUMMARY

An electronic device may receive a specific utterance from a user, and execute a specific task according to the received utterance. For example, the executed task may include displaying a specific screen, or outputting a specific voice corresponding to the received utterance, and/or the like. If the electronic device receives a user utterance and displays a specific screen, information displayed on a screen appears may appear quite small to a user located distally from the electronic device, presenting a challenge in providing visually accurate and legible information by display. The electronic device is often limited in the size of a screen to be displayed on a display, rendering it impossible to provide to a distal user with a large amount of information while maintaining sufficient visibility.

If the electronic device outputs a specific screen through a curved display such as a curved display, a cylindrical display, and/or the like, it may likewise be difficult to accurately provide information through the screen, due to the characteristics of a display having a curvature. For example, information (or content) displayed on the screen (particularly, near an edge of the screen) may be perceived as curved (i.e., distorted) in shape to a viewing user, due to the curvature of the screen.

According to certain embodiments of the disclosure, an electronic device may include a display, at least one camera, at least one microphone, a communication circuit, at least one processor which is a part of the electronic device or remotely communicates with the electronic device, and a memory which is located on the electronic device or outside the electronic device and operably connected to the at least one processor, the memory may be configured to store instructions that, when executed, cause the at least one processor to: receive an utterance of a user via the at least one microphone, obtain at least a first image using the at least one camera, transmit, to a server by using the communication circuit, utterance information corresponding to the received utterance of the user, and at least the first image, and receive, from the server by using the communication circuit, operational information identified based on the utterance information and the at least the first image, and execute a task according to the received operational information, wherein the operational information causes the at least one processor to: display a first screen on the display, the first screen including a first plurality of objects which are displayed based on a first size, and change the first screen to a second screen based at least in part on a movement of the user identified based on the at least the first image, the movement requesting display of the second screen, wherein the second screen includes a second plurality of objects based on a second size different from the first size, and a count of the second plurality of objects is different from a count of the first plurality of objects.

According to certain embodiments of the disclosure, a method of controlling an electronic device may include receiving an utterance of a user via at least one microphone, transmitting, to a server by using a communication circuit, utterance information corresponding to the received utterance of the user, displaying a first screen on a display, the first screen including a first plurality of objects which are displayed based on a first size, obtaining at least one first image using at least one camera and transmitting the at least one first image to the server, and changing the first screen to a second screen based at least in part on a movement of the user identified by the server based on the at least the first image requesting display of the second screen, wherein the second screen includes a second plurality of objects which are displayed based on a second size different from the first size.

According to various embodiments of the disclosure, an electronic device may include a display, at least one camera, at least one microphone, a communication circuit, at least one processor which is a part of the electronic device or remotely communicates with the electronic device, and a memory which is located on the electronic device or outside the electronic device and operably connected to the at least one processor, the memory may be configured to store instructions that, when executed, cause the at least one processor to: receive an utterance of a user through the at least one microphone, display a first screen on the display according to the received utterance of the user, the first screen including a plurality of objects which are based on a first size, obtain at least one first image by using the at least one camera, identify movement of the user based on the obtained at least one first image, and change the first screen to a second screen at least in part based on the identified movement of the user to display the second screen, and the second screen may include a plurality of objects which are based on a second size different from the first size.

An electronic device according to certain embodiments of the disclosure may provide a user with visual convenience by changing a size or the number of objects displayed through a display in the electronic device according to a distance where the user is located from the electronic device and displaying the objects whose size or the number is changed.

An electronic device according to certain embodiments of the disclosure may provide a user with visual convenience by changing a display direction of a screen displayed through a display according to a direction where the user is located from the electronic device and displaying the screen whose display direction is changed.

An electronic device according to certain embodiments of the disclosure may provide a visual effect, such as when a user sees an object on a flat surface, by providing a screen for which curved surface distortion correction is performed in the electronic device with a curved-shape display.

Various effects exerted by the present disclosure are not limited by the above-described effects.

BRIEF DESCRIPTION OF THE DRAWINGS

FIG. 17 is a block diagram illustrating an electronic device in a network environment according to certain embodiments.

DETAILED DESCRIPTION

Figure 1:
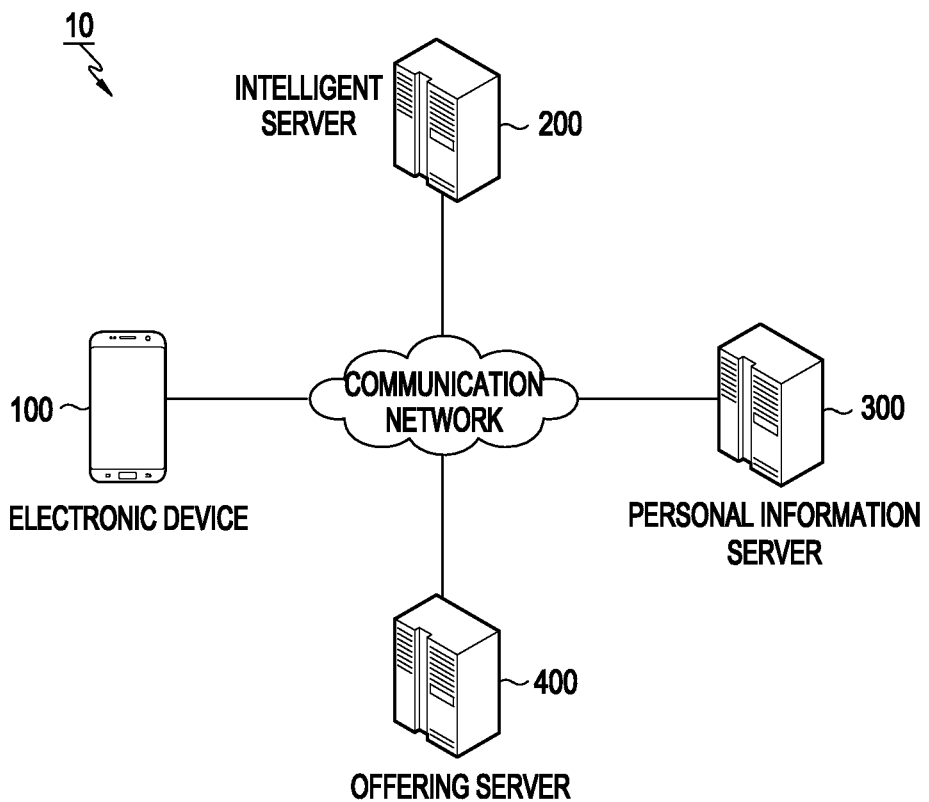
FIG. 1 is a diagram for describing an integrated intelligent system according to certain embodiments of the disclosure.

FIG. 1 is an example diagram for describing an integrated intelligent system 10.

Referring to FIG. 1, the integrated intelligent system 10 may include an electronic device 100 (e.g., an electronic device 1701 in FIG. 17), an intelligent server 200 (e.g., an electronic device 1702 or a server 1708 in FIG. 17), a personal information server 300, or an offering server 400.

According to certain embodiments of the disclosure, the electronic device 100 may provide a service for a user through an app (or an application, e.g., an alarm clock app, a message app, a photo (gallery) app, and the like) stored in the electronic device 100. For example, the electronic device 100 according to certain embodiments of the disclosure may execute and operate an app through an intelligent app (or a voice recognition app) stored in the electronic device 100. The electronic device 100 according to certain embodiments of the disclosure may receive user input to execute and operate the app through the intelligent app. The user input according to certain embodiments of the disclosure may be received through, for example, a physical button, a touch pad, voice input, remote input, or the like. According to certain embodiments, the electronic device 100 may include various terminal devices (or electronic devices) capable of connecting to the Internet, such as a mobile phone, a smartphone, a personal digital assistant (PDA), or a notebook computer.

According to certain embodiments of the disclosure, the electronic device 100 may receive an utterance of the user as user input. The electronic device 100 according to certain embodiments of the disclosure may receive the utterance of the user and may generate a command to operate an app on the basis of the utterance of the user. Accordingly, the electronic device 100 according to certain embodiments of the disclosure may operate the app using the command.

The intelligent server 200 according to certain embodiments of the disclosure may receive user voice input from the electronic device 100 through a communication network and may change the user voice input into text data. The intelligent server 200 according to certain embodiments of the disclosure may generate (or select) a path rule on the basis of the text data. The path rule according to certain embodiments of the disclosure may include information about an action (or operation) for performing the function of an app or information about a parameter utilized to execute the action. In addition, the path rule according to certain embodiments of the disclosure may include the order of the action of the app. The electronic device 100 according to certain embodiments of the disclosure may receive the path rule, may select an app according to the path rule, and may execute an action included in the path rule in the selected app.

The term "path rule" described in the present disclosure may generally refer to a sequence of states for the electronic device 100 to provide a task requested by a user, but is not limited thereto. That is, the path rule according to certain embodiments of the disclosure may include information about the sequence of states. The task may be, for example, any action that an intelligent app can perform. The task may include generating a schedule, transmitting a photo to a desired counterpart, or providing weather information. The electronic device 100 may sequentially have at least one or more states (e.g., an operating state of the electronic device 100), thereby providing the task.

According to certain embodiments of the disclosure, the path rule may be provided or generated by an artificially intelligent (AI) system. The AI system may be a rule-based system, a neural-network-based system (e.g., a feedforward neural network (FNN) or a recurrent neural network (RNN)). Alternatively, the AI system may be a combination of the foregoing systems or a different AI system. According to certain embodiments of the disclosure, the path rule may be selected from a predefined set of path rules or may be generated in real time in response to a user request. For example, the AI system may select at least a path rule from among a plurality of predefined path rules or may generate a path rule dynamically (or in real time). In addition, the electronic device 100 according to certain embodiments of the disclosure may use a hybrid system to provide a path rule.

According to certain embodiments of the disclosure, the electronic device 100 may execute the action and may display a screen corresponding to the state of the electronic device 100 executing the action on a display. According to certain embodiments of the disclosure, the electronic device 100 may execute the action, but may not display the result of executing the action on the display. For example, the electronic device 100 may execute a plurality of actions and may display the result of executing some of the plurality of actions on the display. Specifically, the electronic device 100 according to certain embodiments of the disclosure may display the result of executing the last action on the display (e.g., to the exclusion of other data). In another example, the electronic device 100 according to certain embodiments of the disclosure may display the result of executing the action on the display upon receiving user input.

The personal information server 300 according to certain embodiments of the disclosure may include a database that stores user information. For example, the personal information server 300 according to certain embodiments of the disclosure may receive user information (e.g., context information, app execution information, or the like) from the electronic device 100 and may store the user information in the database. The intelligent server 200 may receive the user information from the personal information server 300 through the communication network and may use the user information for generating a path rule for user input. According to certain embodiments of the disclosure, the electronic device 100 may receive the user information from the personal information server 300 through the communication network and may use the user information as information for managing the database.

The offering server 400 according to certain embodiments of the disclosure may include a database that stores information about the function of a terminal or the function of an application to be introduced or provided. For example, the offering server 400 according to certain embodiments of the disclosure may receive the user information of the electronic device 100 from the personal information server 300 and may thus include a database of functions that the user can use. The electronic device 100 may receive the information about the function to be provided from the offering server 400 through the communication network and may provide the information for the user.

Figure 2:
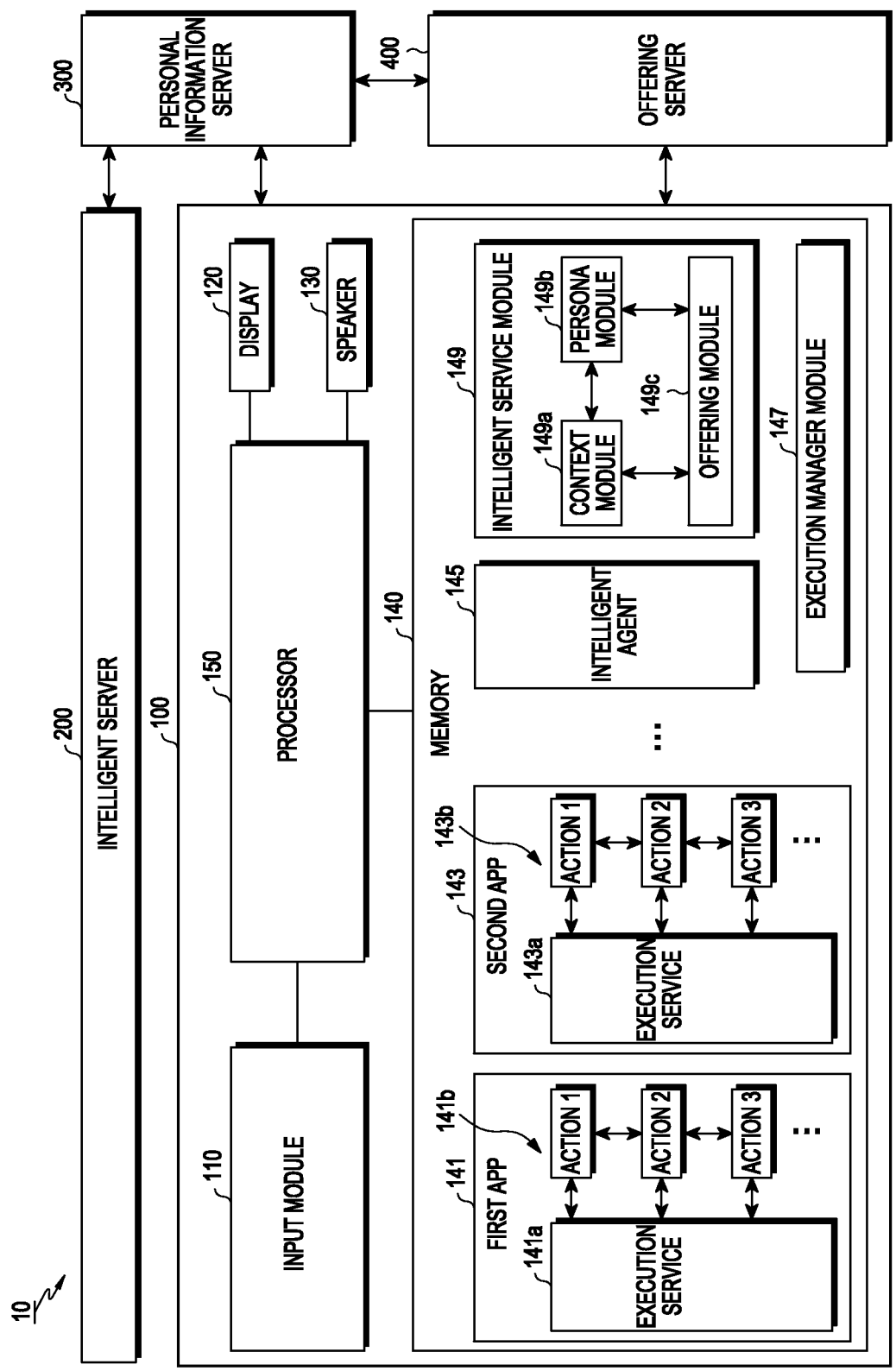
FIG. 2 is a block diagram for describing an electronic device in an integrated intelligent system according to certain embodiments of the disclosure.

Referring to FIG. 2, an electronic device 100 according to certain embodiments of the disclosure may include an input module 110 (e.g., an input device 1750 in FIG. 17), a display 120 (e.g., a display device 1760 in FIG. 17), a speaker 130 (e.g., a sound output device 1755 in FIG. 17), a memory 140 (e.g., a memory 1730 in FIG. 17), or a processor 150 (e.g., a processor 1720 in FIG. 17). The electronic device 100 may further include a housing, and the components of the electronic device 100 may be seated inside the housing or may be disposed on the housing. The electronic device 100 according to certain embodiments of the disclosure may further include a communication circuit (e.g., a communication module 1790 in FIG. 17) disposed inside the housing. The electronic device 100 according to certain embodiments of the disclosure may transmit and receive data (or information) to and from an external server (e.g., an intelligent server 200) through the communication circuit (e.g., the communication module 1790 in FIG. 17).

According to certain embodiments of the disclosure, the input module 110 may receive user input from a user. For example, the input module 110 according to certain embodiments of the disclosure may receive user input from a connected external device (e.g., a keyboard or a headset). In another example, the input module 110 according to certain embodiments of the disclosure may include a touch screen (e.g., a touch screen display) combined with the display 120. In still another example, the input module 110 may include a hardware key (or physical key) disposed in the electronic device 100 (or the housing of the electronic device 100).

According to certain embodiments of the disclosure, the input module 110 may include a microphone capable of receiving an utterance of the user as an audio signal. For example, the input module 110 according to certain embodiments of the disclosure may include a speech input system and may receive an utterance of the user as an audio signal through the speech input system. The microphone may be exposed through, for example, a portion (e.g., a first portion) of the housing.

According to certain embodiments of the disclosure, the display 120 may display an image, a video, and/or an execution screen of an application. For example, the display 120 may display a graphic user interface (GUI) of the app. According to certain embodiments, the display 120 may be exposed through a portion (e.g., a second portion) of the housing.

According to certain embodiments of the disclosure, the speaker 130 may output an audio signal. For example, the speaker 130 according to certain embodiments of the disclosure may output an audio signal generated in the electronic device 100 to the outside. According to certain embodiments, the speaker 130 may be exposed through a portion (e.g., a third portion) of the housing.

According to certain embodiments of the disclosure, the memory 140 may store a plurality of apps (or application programs) 141 and 143 (e.g., a program 1740 in FIG. 17). The plurality of apps 141 and 143 may be, for example, programs for performing a function corresponding to user input. According to certain embodiments, the memory 140 may store an intelligent agent 145, an execution manager module 147, or an intelligent service module 149. The intelligent agent 145, the execution manager module 147, and the intelligent service module 149 may be, for example, frameworks (or application frameworks) for processing received user input (e.g., user utterances).

According to certain embodiments of the disclosure, the memory 140 may include a database that may store information utilized to recognize user input. For example, the memory 140 may include a log database that may store log information. In another example, the memory 140 may include a user database that may store user information.

According to certain embodiments of the disclosure, the memory 140 may store the plurality of apps 141 and 143, and the plurality of apps 141 and 143 may be loaded and operated. For example, the plurality of apps 141 and 143 stored in the memory 140 may be loaded and operated by an execution manager module 147. The plurality of apps 141 and 143 may include execution service modules 141a and 143a that perform a function. In certain embodiments, the plurality of apps 141 and 143 may execute a plurality of actions (e.g., a sequence of states) 141b and 143b through the execution service modules 141a and 143a in order to perform a function. That is, the execution service modules 141a and 143a may be activated by the execution manager module 147 and may execute the plurality of actions 141b and 143b.

According to certain embodiments of the disclosure, when the actions 141b and 143b of the apps 141 and 143 are executed, an execution state screen corresponding to the execution of the actions 141b and 143b may be displayed on the display 120. The execution state screen according to certain embodiments of the disclosure may be, for example, a screen indicating the completion of the actions 141b and 143b. In another example, the execution state screen may be a screen displaying the state in which the execution of the actions 141b and 143b is suspended (partial landing, e.g., when a parameter utilized for the actions 141b and 143b is not input).

According to certain embodiments of the disclosure, the execution service modules 141a and 143a may execute the actions 141b and 143b according to a path rule. For example, the execution service modules 141a and 143a according to certain embodiments of the disclosure may be activated by the execution manager module 147, may receive an execution request from the execution manager module 147 according to the path rule, and may perform the actions 141b and 143b according to the execution request, thereby executing the functions of the apps 141 and 143. When the execution of the actions 141b and 143b is completed, the execution service modules 141a and 143a may transmit information indicating completion to the execution manager module 147.

According to certain embodiments of the disclosure, when the plurality of actions 141b and 143b is executed in the apps 141 and 143, the plurality of actions 141b and 143b may be sequentially executed. When the execution of one action (e.g., action 1 of a first app 141 and action 1 of a second app 143) is completed, the execution service modules 141a and 143a may then open the next action (e.g., action 2 of the first app 141 and action 2 of the second app 143), and may transmit information indicating completion to the execution manager module 147. Opening any action may be understood as transitioning any action to an executable state or preparing any action for execution. That is, when an action is not open, the action cannot be executed. Upon receiving the information indicating completion, the execution manager module 147 may transmit an execution request for the next action (e.g., action 2 of the first app 141 and action 2 of the second app 143) to the execution service modules. According to certain embodiments, when the plurality of apps 141 and 143 is executed, the plurality of apps 141 and 143 may be sequentially executed. For example, when the execution of the last action of the first app 141 (e.g., action 3 of the first app 141) is completed and information indicating completion is received, the execution manager module 147 may transmit an execution request for a first action of the second app 143 (e.g., action 1 of the second app 143) to the execution service module 143a.

According to certain embodiments of the disclosure, when the plurality of actions 141b and 143b is executed in the apps 141 and 143, a screen generated as a result of execution of each of the plurality of executed actions 141b and 143b may be displayed on the display 120. According to certain embodiments, some of a plurality of screens generated as a result of execution of the plurality of executed actions 141b and 143b may be displayed on the display 120.

According to certain embodiments of the disclosure, the memory 140 may store an intelligent app (e.g., a voice recognition app) interworking with the intelligent agent 145. The app interworking with the intelligent agent 145 according to certain embodiments of the disclosure may receive and process an utterance of the user as an audio signal. According to certain embodiments, the app interworking with the intelligent agent 145 may be operated by specific input (e.g., input through the hardware key, input through the touch screen, or specific voice input) made through the input module 110.

According to certain embodiments of the disclosure, the intelligent agent 145, the execution manager module 147, or the intelligent service module 149 stored in the memory 140 may be executed by the processor 150. A function of the intelligent agent 145, the execution manager module 147, or the intelligent service module 149 according to certain embodiments of the disclosure may be implemented by the processor 150. Functions of the intelligent agent 145, the execution manager module 147, and the intelligent service module 149 according to certain embodiments of the disclosure will be described with reference to the operation of the processor 150. According to certain embodiments, the intelligent agent 145, the execution manager module 147, or the intelligent service module 149 stored in the memory 140 may be configured not only as software but also as hardware.

According to certain embodiments of the disclosure, the processor 150 may control the overall operation of the electronic device 100. For example, the processor 150 may control the input module 110 to receive user input. The processor 150 according to certain embodiments of the disclosure may control the display 120 to display an image. The processor 150 according to certain embodiments of the disclosure may control the speaker 130 to output an audio signal. The processor 150 according to certain embodiments of the disclosure may control the memory 140 to execute a program and to invoke or store information.

According to certain embodiments of the disclosure, the processor 150 may execute the intelligent agent 145, the execution manager module 147, or the intelligent service module 149 stored in the memory 140. Accordingly, the processor 150 according to certain embodiments of the disclosure may implement the function of the intelligent agent 145, the execution manager module 147, or the intelligent service module 149.

According to certain embodiments of the disclosure, the processor 150 may execute the intelligent agent 145 to generate a command to operate an app on the basis of an audio signal received through user input. According to certain embodiments, the processor 150 may execute the execution manager module 147 to execute the apps 141 and 143 stored in the memory 140 according to the generated command. According to certain embodiments, the processor 150 may execute the intelligent service module 149 to manage the user information and to process user input using the user information.

The processor 150 according to certain embodiments of the disclosure may execute the intelligent agent 145 to transmit user input, received through the input module 110, to the intelligent server 200 and to process the user input through the intelligent server 200.

According to certain embodiments of the disclosure, the processor 150 may execute the intelligent agent 145 to preprocess the user input before transmitting the user input to the intelligent server 200. According to certain embodiments, the intelligent agent 145 may include an adaptive echo canceller (AEC) module, a noise suppression (NS) module, an endpoint detection (EPD) module, or an automatic gain control (AGC) module in order to preprocess the user input. The adaptive echo canceller module according to certain embodiments of the disclosure may reduce an echo included in the user input. The noise suppression module according to certain embodiments of the disclosure may suppress background noise included in the user input. The endpoint detection module according to certain embodiments of the disclosure may detect an endpoint of a user voice included in the user input and may discover a portion including the user voice using the detected endpoint. The automatic gain control module may recognize the user input and may adjust the volume of the user input appropriately in order to process the recognized user input. According to certain embodiments, the processor 150 may execute all of the preprocessing components in order to improve performance. However, in other embodiments, the processor 150 may execute some of the preprocessing components in order to operate with low power.

According to certain embodiments of the disclosure, the intelligent agent 145 may execute a wake-up recognition module stored in the memory 140 in order to recognize a call from the user. Accordingly, the processor 150 according to certain embodiments of the disclosure may recognize a wake-up command of the user through the wake-up recognition module, and may execute the intelligent agent 145 to receive user input when receiving the wake-up command. The wake-up recognition module according to certain embodiments of the disclosure may be configured as a low-power processor (e.g., a processor included in an audio codec). According to certain embodiments, the processor 150 may execute the intelligent agent 145 when receiving user input through the hardware key. When the intelligent agent 145 is executed, the intelligent app (e.g., the voice recognition app) interworking with the intelligent agent 145 may be executed.

According to certain embodiments of the disclosure, the intelligent agent 145 may include a voice recognition module for executing user input. The processor 150 may recognize user input to execute an action in an app through the voice recognition module. For example, the processor 150 may recognize limited user (voice) input (e.g., an utterance like "click" to execute a photographing action during the execution of a camera app) to execute an action, such as the wake-up command, in the apps 141 and 143 through the voice recognition module. The processor 150 according to certain embodiments of the disclosure may recognize and quickly process a user command that can be processed in the electronic device 100 through the voice recognition module to assist the intelligent server 200. According to certain embodiments, the voice recognition module of the intelligent agent 145 for executing user input may be implemented in an app processor.

According to certain embodiments of the disclosure, the voice recognition module (including a voice recognition module of a wake-up module) of the intelligent agent 145 may recognize user input using an algorithm for recognizing a voice. The algorithm used to recognize a voice according to certain embodiments of the disclosure may be, for example, at least one of a hidden Markov model (HMM) algorithm, an artificial neural network (ANN) algorithm, or a dynamic time warping (DTW) algorithm.

According to certain embodiments of the disclosure, the processor 150 may execute the intelligent agent 145 to convert the voice input of the user into text data. For example, the processor 150 according to certain embodiments of the disclosure may transmit the voice of the user to the intelligent server 200 through the intelligent agent 145 and may receive text data corresponding to the voice of the user from the intelligent server 200. Accordingly, the processor 150 according to certain embodiments of the disclosure may display the converted text data on the display 120.

According to certain embodiments of the disclosure, the processor 150 may execute the intelligent agent 145 to receive a path rule from the intelligent server 200. According to certain embodiments, the processor 150 may transmit the path rule to the execution manager module 147 through the intelligent agent 145.

According to certain embodiments of the disclosure, the processor 150 may execute the intelligent agent 145 to transmit an execution result log according to the path rule received from the intelligent server 200 to the intelligent service module 149. The transmitted execution result log may be accumulated and managed in user preference information of the persona module 149*b*.

According to certain embodiments of the disclosure, the processor 150 may execute the execution manager module 147 to receive the path rule from the intelligent agent 145, thus executing the apps 141 and 143 and enabling the apps 141 and 143 to execute the actions 141*b* and 143*b* included in the path rule. For example, the processor 150 may transmit command information (e.g., path rule information) for executing the actions 141*b* and 143*b* to the apps 141 and 143 through the execution manager module 147 and may receive information indicating completion of the actions 141*b* and 143*b* from the apps 141 and 143.

According to certain embodiments of the disclosure, the processor 150 may execute the execution manager module 147 to transmit the command information (e.g., path rule information) for executing the actions 141*b* and 143*b* of the apps 141 and 143 between the intelligent agent 145 and the apps 141 and 143. The processor 150 may bind the apps 141 and 143 to be executed according to the path rule through the execution manager module 147 and may transmit the command information (e.g., path rule information) about the actions 141*b* and 143*b* included in the path rule to the apps 141 and 143. For example, the processor 150 may sequentially transmit the actions 141*b* and 143*b* included in the path rule to the apps 141 and 143 through the execution manager module 147 and may sequentially execute the actions 141*b* and 143*b* of the apps 141 and 143 according to the path rule.

According to certain embodiments of the disclosure, the processor 150 may execute the execution manager module 147 to manage the execution state of the actions 141*b* and 143*b* of the apps 141 and 143. For example, the processor 150 may receive information about the execution state of the actions 141*b* and 143*b* from the apps 141 and 143 through the execution manager module 147. When the execution state of the actions 141*b* and 143*b* is, for example, an inactive state (partial landing, e.g., when a parameter utilized for the actions 141*b* and 143*b* is not input), the processor 150 may transmit information about the inactive state to the intelligent agent 145 through the execution manager module 147. The processor 150 may request the user to input utilized information (e.g., parameter information) using the received information through the intelligent agent 145. When the execution state of the actions 141*b* and 143*b* is a different state, for example, an active state, the processor 150 may receive an utterance from the user through the intelligent agent 145. The processor 150 may transmit information about the apps 141 and 143 being executed and the execution state of the apps 141 and 143 to the intelligent agent 145 through the execution manager module 147. The processor 150 may transmit the utterance of the user to the intelligent server 200 through the intelligent agent 145. The processor 150 may receive parameter information about the utterance of the user from the intelligent server 200 through the intelligent agent 145. The processor 150 may transmit the received parameter information to the execution manager module 147 through the intelligent agent 145. The execution manager module 147 may change a parameter of the actions 141*b* and 143*b* to a new parameter using the received parameter information.

According to certain embodiments of the disclosure, the processor 150 may execute the execution manager module 147 to transmit parameter information included in the path rule to the apps 141 and 143. When the plurality of apps 141 and 143 is sequentially executed according to the path rule, the execution manager module 147 may transmit the parameter information included in the path rule from one app to another app.

According to certain embodiments of the disclosure, the processor 150 may execute the execution manager module 147 to receive a plurality of path rules. The processor 150 may select a plurality of path rules on the basis of the utterance of the user through the execution manager module 147. For example, when the utterance of the user specifies an app 141 to execute some actions 141*a* but does not specify different apps 143 to execute other actions 143*b* through the execution manager module 147, the processor 150 may receive a plurality of different path rules for respectively executing the same app 141 (e.g., a gallery app) to execute the actions 141*a* and the different apps 143 (e.g., a message app and a telegram app) to execute the other actions 143*b*. The processor 150 may execute, for example, identical actions 141*b* and 143*b* (e.g., successive identical actions 141*b* and 143*b*) of the plurality of path rules through the execution manager module 147. After the identical actions are executed, the processor 150 may display a state screen for selecting different apps 141 and 143 respectively included in the plurality of path rules through the execution manager module 147 on the display 120.

According to certain embodiments of the disclosure, the intelligent service module 149 may include a context module 149*a*, the persona module 149*b*, or an offering module 149*c*.

The processor 150 according to certain embodiments of the disclosure may execute the context module 149*a* to collect information about the current state of the apps 141 and 143 from the apps 141 and 143. For example, the processor 150 may execute the context module 149*a* to receive context information indicating the current state of the apps 141 and 143 and may collect information about the current state of the apps 141 and 143 through the received context information.

The processor 150 according to certain embodiments of the disclosure may execute the persona module 149*b* to manage personal information about the user using the electronic device 100. For example, the processor 150 may execute the persona module 149*b* to collect usage information about the electronic device 100 and an execution result and may manage the personal information about the user using the collected usage information about the electronic device 100 and the execution result.

The processor 150 according to certain embodiments of the disclosure may execute the offering module 149*c* to predict the intent of the user and may recommend a command to the user on the basis of the intent of the user. For example, the processor 150 may execute the offering module 149*c* to recommend a command to the user according to the current state of the user (e.g., time, a place, a condition, or an app).

Figure 3:
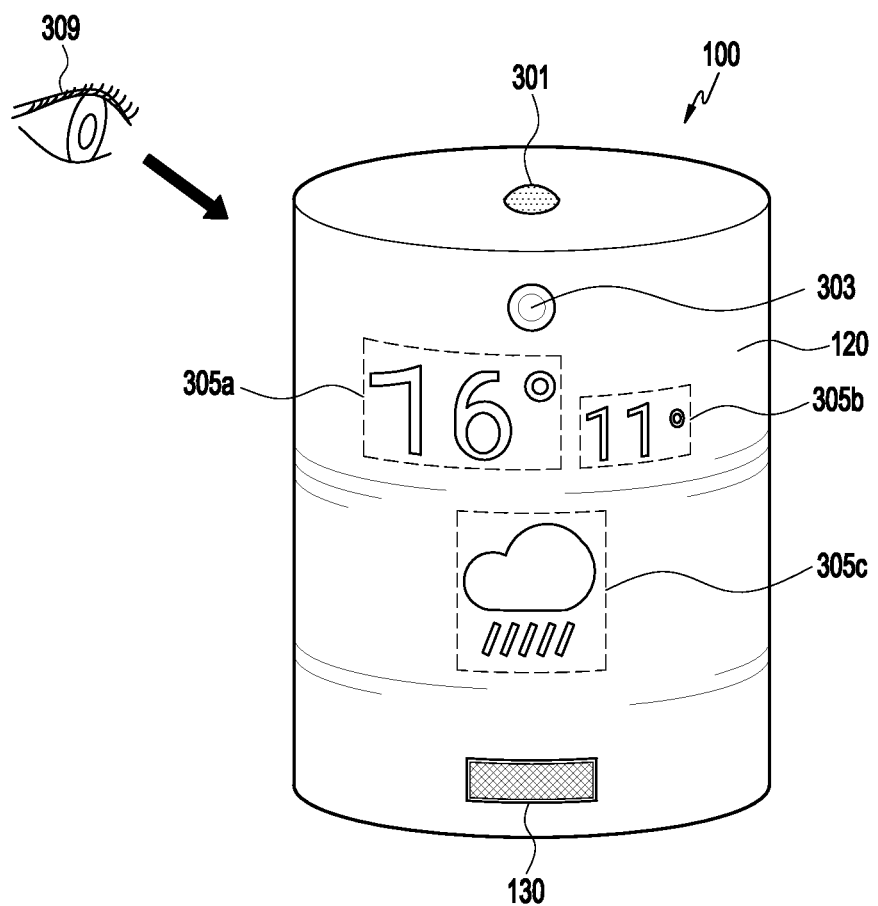
FIG. 3 is a perspective view for describing an electronic device according to certain embodiments of the disclosure.

FIG. 3 is a perspective view for describing an electronic device 100 according to certain embodiments of the disclosure.

Referring to FIG. 3, the electronic device 100 (e.g., an electronic device 1701 in FIG. 17) according to certain embodiments of the disclosure may include at least one of a microphone 301 (e.g., an input module 110 in FIG. 2 or an input device 1750 in FIG. 17), a camera 303 (e.g., a camera module 1780 in FIG. 17), a display 120 (e.g. a display device 1760 in FIG. 17), or a speaker 130 (e.g., a sound output device 1755 in FIG. 17).

The microphone 301 according to certain embodiments of the disclosure may be exposed through a portion (e.g., an upper portion) of the electronic device 100. The number of microphones 301 according to certain embodiments of the disclosure may be one or more. In this case, a plurality of microphones according to certain embodiments of the disclosure may be disposed apart from each other at regular intervals on a side portion of the electronic device 100. The microphone 301 according to certain embodiments of the disclosure may receive audio occurring from various sound sources from an exterior of the device. For example, the microphone 301 according to certain embodiments of the disclosure may receive a voice (e.g., a user utterance) from a user under the control of a processor (e.g., a processor 150 in FIG. 2). The microphone 301 according to certain embodiments of the disclosure may be implemented in various forms such as, for example, a unidirectional microphone, a super directional microphone, a bidirectional microphone, and/or the like, and there is no limitation on an implementation form. The electronic device 100 according to certain embodiments of the disclosure may estimate an input direction and/or a distance of a sound source by using gain and/or delay information of an electrical signal which is generated by converting audio received from the sound source by the microphone 301.

The camera 303 according to certain embodiments of the disclosure may be exposed (or disposed in) through a portion (e.g., a side portion) of the electronic device 100. The number of cameras 303 according to certain embodiments of the disclosure may be one or more. In this case, a plurality of cameras according to certain embodiments of the disclosure may be disposed to be spaced apart from each other at regular intervals on the side portion of the electronic device. The camera 303 according to certain embodiments of the disclosure may be capable of capturing a still image and/or a moving image, and may include at least one of one or more image sensors, lenses, an image signal processor (ISP), or a flash (e.g., an LED, an xenon lamp, and/or the like). The camera 303 according to certain embodiments of the disclosure may photograph (obtain) at least one image under the control of the processor (e.g., the processor 150 in FIG. 2). The camera 303 according to certain embodiments of the disclosure may include a camera (e.g., a 360-degree camera) capable of providing a spherical picture by photographing horizontal and/or vertical 360 degrees omnidirectionally through a plurality of lenses. In this case, the camera (e.g., a 360-degree photographing camera) according to certain embodiments of the disclosure may be disposed (mounted) on an upper side of the electronic device to perform omnidirectional photographing.

The speaker 130 according to certain embodiments of the disclosure may be exposed through a portion (e.g., a side portion or an upper portion) of the electronic device. The speaker 130 according to certain embodiments of the disclosure may output a sound (e.g., a vocal signal) to the exterior environment of the device by using a voice signal generated inside the electronic device 100 or received from an external electronic device (e.g., an intelligent server 200). The speaker 130 according to certain embodiments of the disclosure may include a plurality of speakers.

The display 120 according to certain embodiments of the disclosure may be exposed through a portion (e.g., a side portion) of the electronic device 100. The display 120 according to certain embodiments of the disclosure may include a flexible display whose at least portion is exposed from the electronic device 100 in a curved state according to a designated curvature. The display 120 according to certain embodiments of the disclosure may be included in all or a part of a side of the electronic device 100. The electronic device 100 according to certain embodiments of the disclosure may display a screen including at least one object (e.g., 305*a*, 305*b*, or 305*c*) on all or a part of the display 120. In FIG. 3, each object (e.g., 305*a*, 305*b* and 305*c*) according to certain embodiments of the disclosure may be a graphic object indicating the highest temperature, the lowest temperature, and weather. Each object (e.g., 305*a*, 305*b*, and 305*c*) will be described in detail with reference to other drawings of the disclosure to be described later.

Figure 4A:
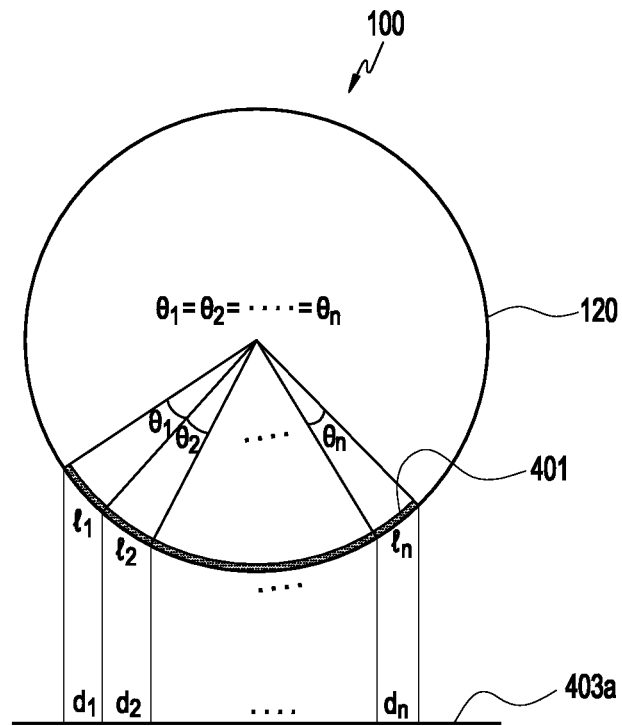
FIG. 4a is an example diagram for describing curved surface distortion correction according to certain embodiments of the disclosure.
Figure 4B:
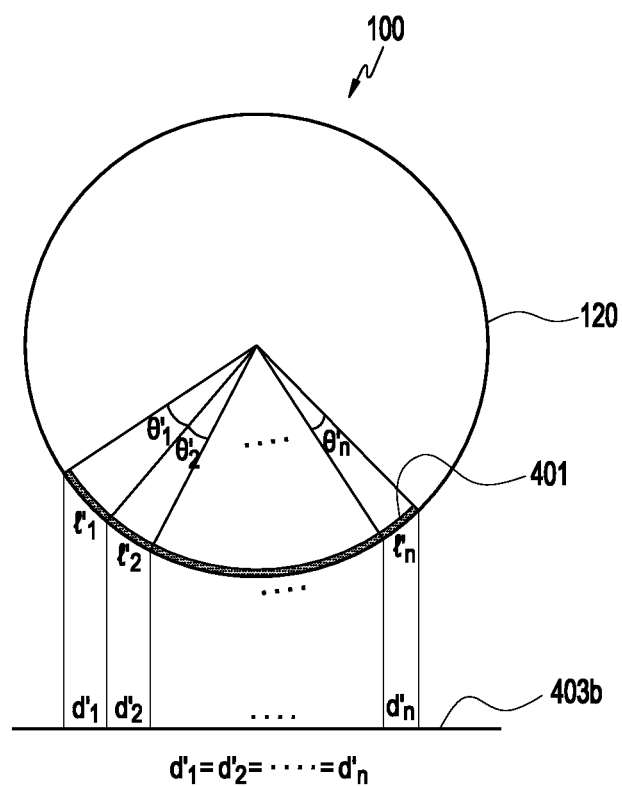
FIG. 4b is an example diagram for describing curved surface distortion correction according to certain embodiments of the disclosure.
Figure 4C:
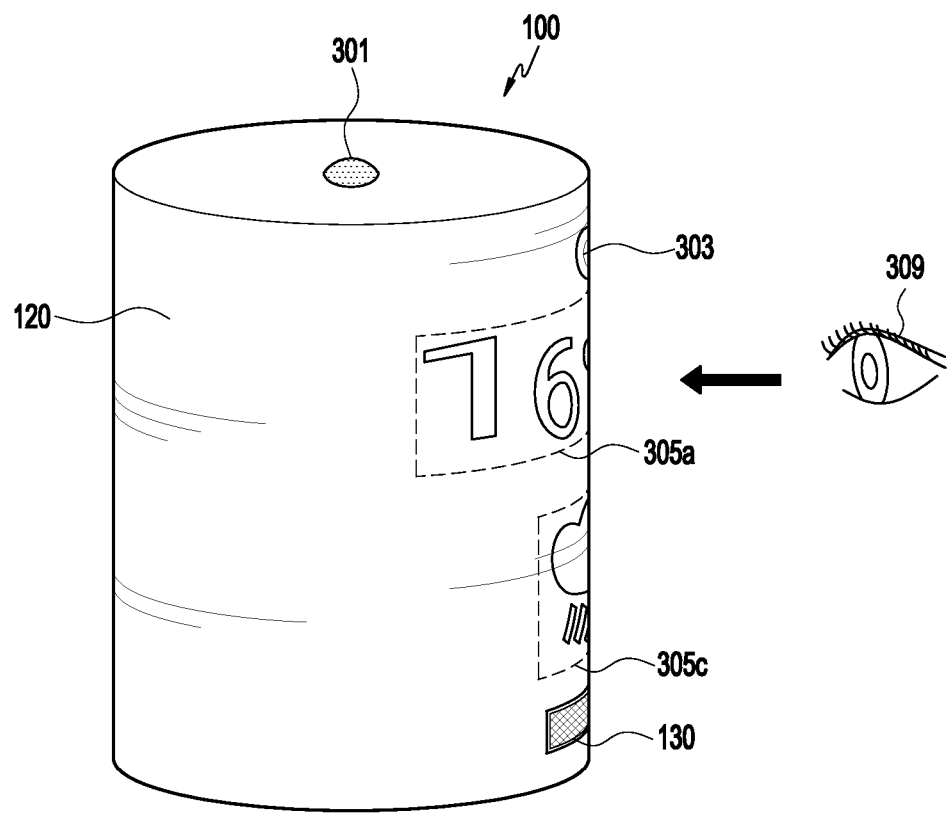
FIG. 4c is an example diagram for describing curved surface distortion correction according to certain embodiments of the disclosure.

According to certain embodiments of the disclosure, if a user 309 views the electronic device 100 from the left, as shown in FIG. 4*c* to be described later, the electronic device 100 may display, on the display 120, a screen including at least one object displayed on a screen for which curved surface distortion correction is performed.

FIGS. 4*a* to 4*c* are example diagrams for describing curved surface distortion correction according to certain embodiments of the disclosure.

Referring to FIG. 4*a*, an electronic device 100 according to certain embodiments of the disclosure may include a flexible display whose at least portion is exposed from the electronic device 100 in a curved state according to a designated curvature. A first screen 401 including a plurality of objects may be displayed on at least a partial area of a display 120 according to certain embodiments of the disclosure.

According to certain embodiments of the disclosure, if the electronic device 100 outputs an image (e.g., the first screen 401) including the plurality of objects in the same manner as in a general flat display, a plurality of first partial screens may have a plurality of circumferential angles ($\theta_m$, m=1, 2, ..., n) of the same angle and have the same arc length ($l_m$, m=1, 2, ..., n). According to certain embodiments of the disclosure, if a user views the first screen 401 which displays the plurality of objects, the first screen 401 may be recognized as a second screen 403*a* which is projected on a flat surface by the user. The second screen 403*a* according to certain embodiments of the disclosure may be viewed as a distorted screen due to a designated curvature of the display 120. For example, each of a plurality of second partial screens may have different lengths (i.e., horizontal lengths) ($d_m$, m=1, 2, ..., n). Due to this, with respect to objects (e.g., objects displayed on $l_1$ or $l_n$) displayed relatively outside on the first screen 401*a*, a curved surface distortion in which the objects displayed relatively outside on the first screen 401*a* are displayed with a horizontal width which is relatively narrow (e.g., which is projected to $d_1$ or $d_n$) on the second screen 403*a* may occur.

Referring to FIG. 4*b*, a first screen 401 including a plurality of objects may be displayed on at least a partial area of a display 120 according to certain embodiments of the disclosure.

As described in FIG. 4*a*, with respect to the plurality of objects displayed on the display 120 having a designated curvature, the more the objects are relatively displayed on the outside, the greater a curved surface distortion may occur. So, an electronic device 100 according to embodiments of the disclosure may perform (preprocess) a curved surface distortion correction on a screen including a plurality of objects to be outputted through the display 120 and then display, on the first screen 401, the screen for which the curved surface distortion correction is performed. The electronic device 100 according to certain embodiments of the disclosure may perform the curved surface distortion correction on objects (e.g., objects displayed in an area having a length of $l'_1$ or $l'_n$) which are displayed relatively outside in the first screen 401 to have a circumferential angle (e.g., $\theta'_1$ or $\theta'_n$). According to certain embodiments of the disclosure, if a corrected image including curved surface distortion-corrected objects is projected on a flat surface which corresponds to a user viewpoint, projected lengths (e.g., horizontal lengths) (e.g., $d'_m$, m=1, 2, . . . , n) which correspond to arc lengths ($l'_1$ to $l'_n$), respectively, may be equal to each other. As a result, even if the first screen 401 is displayed on the display 120 which is curved according to the designated curvature, when the user views the first screen 401, the user recognizes the first screen 401 as the second screen 403b which is projected on the flat surface, so the curved surface distortion may not occur.

In FIG. 4b described above, it has been described that the electronic device 100 performs the curved surface distortion correction on the objects (e.g., the objects displayed in the area having the length of $l'_1$ or $l'_n$ which are displayed relatively outside, however, the electronic device 100 may perform the curved surface distortion correction on all objects which are displayed on the first screen 301a by performing a large amount of curved surface distortion correction on objects which are displayed relatively outside and performing a small amount of curved surface distortion correction on objects which are displayed relatively inside.

Referring to FIG. 4c, according to certain embodiments of the disclosure, if a user 309 views an electronic device 100 in FIG. 3 from the left, a plurality of objects (e.g., 305a, 305b and 305c) displayed on a display 120 may be viewed by the user 309 as shown in FIG. 4c. In FIG. 4c, the second object 305b among the plurality of objects may not be viewed from the left.

Each of the plurality of objects (e.g., 305a and 305c) according to certain embodiments of the disclosure may be an object on which curved surface distortion correction is performed by the electronic device 100.

Taking the first object 305a as an example among the plurality of objects (e.g., 305a and 305c) according to certain embodiments of the disclosure, a portion (e.g., "1") displayed on the outside (the left) of the first object 305a may be displayed by extending relatively longer in a horizontal direction than a portion (e.g., "6") displayed on the inside (the right), and the portion (e.g., "6") displayed on the inside (the right) of the first object 305a may be displayed by extending relatively shorter in the horizontal direction than the portion (e.g., "1") displayed on the outside (the left).

According to certain embodiments of the disclosure, if the user 309 views the display 120 from the right of the electronic device 100 in FIG. 4c, as described in FIG. 4b, the user may see a screen (e.g., the plurality of objects 305a, 305b and 305c in FIG. 3) displayed on the display 120 as a second screen (e.g., a second screen 403b in FIG. 4b) for which curved surface distortion in a horizontal direction does not occur.

Figure 5:
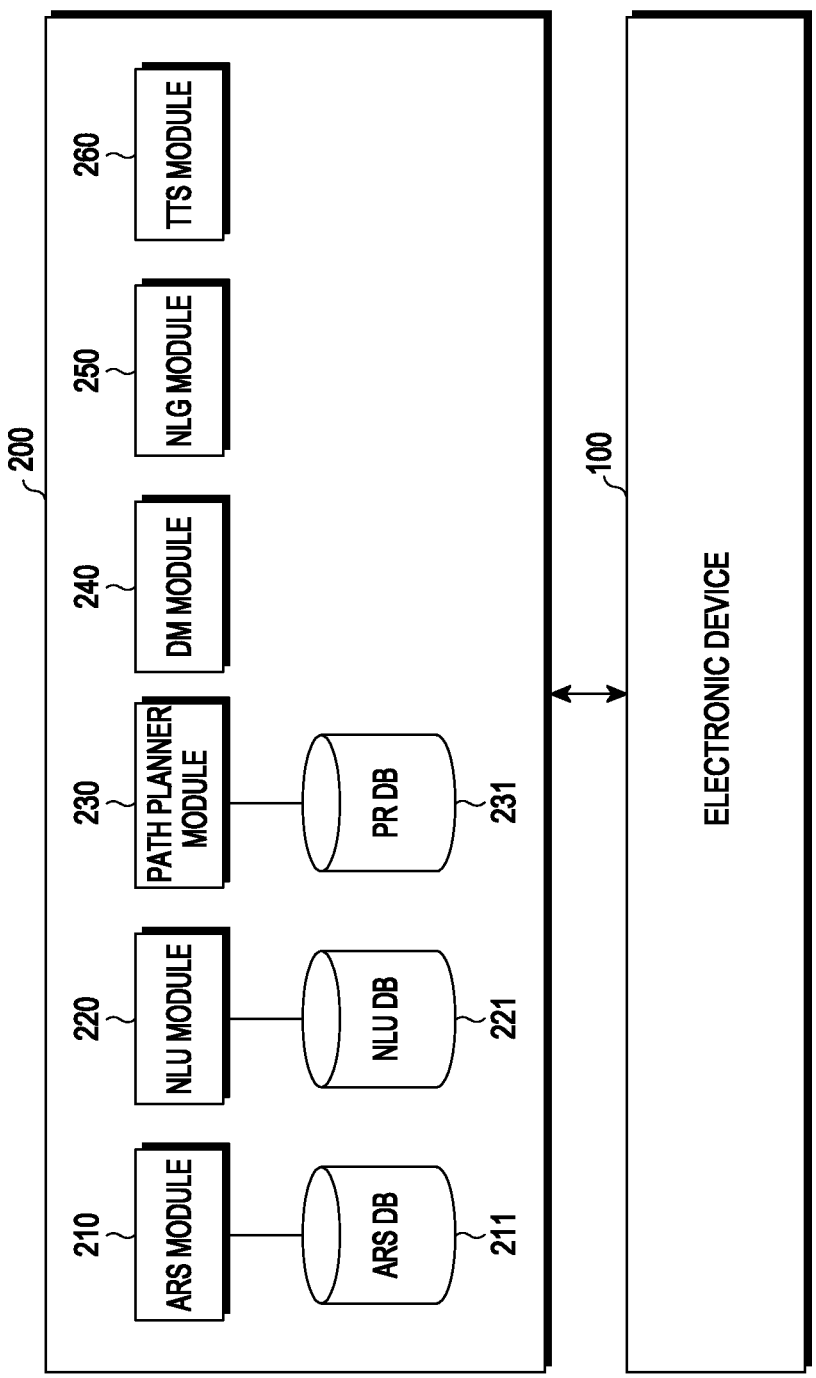
FIG. 5 is a block diagram for describing an intelligent server in an integrated intelligent system according to certain embodiments of the disclosure.

FIG. 5 is a block diagram for describing an intelligent server in an integrated intelligent system according to certain embodiments of the disclosure.

Referring to FIG. 5, the intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to certain embodiments, the intelligent server 200 may include a communication circuit, a memory, and a processor. The processor may execute an instruction stored in the memory, and may operate the automatic speech recognition module 210, the natural language understanding module 220, the path planner module 230, the dialogue manager module 240, the natural language generator module 250, and the text-to-speech module 260. The intelligent server 200 may transmit and receive data (or information) to and from an external electronic device (e.g., an electronic device 100) through the communication circuit.

The natural language understanding module 220 or the path planner module 230 of the intelligent server 200 may generate a path rule.

According to certain embodiments of the disclosure, the automatic speech recognition (ASR) module 210 may convert user input, received from the electronic device 100, into text data.

According to certain embodiments of the disclosure, the automatic speech recognition module 210 may convert user input, received from the electronic device 100, into text data. For example, the automatic speech recognition module 210 may include an utterance recognition module. The utterance recognition module may include an acoustic model and a language model. For example, the acoustic model may include information about a vocalization, and the language model may include phonemic unit information and information about a combination of phonemic unit information. The utterance recognition module may convert a user utterance into text data using the information about the vocalization and the phonemic unit information. Information about the acoustic model and the language model may be stored, for example, in an automatic speech recognition database (ASR DB) 211.

According to certain embodiments of the disclosure, the natural language understanding module 220 may perform syntactic analysis or semantic analysis, thereby determining the intent of the user. The syntactic analysis may be performed by dividing user input into syntactic units (e.g., words, phrases, morphemes, and the like) and determining which syntactic elements the divided units have. The semantic analysis may be performed using semantic matching, rule matching, formula matching, or the like. Accordingly, the natural language understanding module 220 may obtain a domain, intent, or a parameter (or slot) utilized to express the intent from the user input.

According to certain embodiments of the disclosure, the natural language understanding module 220 may determine the intent of the user and a parameter using a matching rule, which is divided into a domain, an intent, and a parameter (or a slot) utilized to determine the intent. For example, one domain (e.g. an alarm) may include a plurality of intents (e.g., setting an alarm, disarming an alarm, or the like), and one intent may include a plurality of parameters (e.g. a time, the number of repetitions, an alarm sound, or the like). A plurality of rules may include, for example, one or more essential element parameters. The matching rule may be stored in a natural language understanding database (NLU DB) 221.

According to certain embodiments of the disclosure, the natural language understanding module 220 may identify the meaning of a word extracted from the user input using linguistic features (e.g., syntactic elements), such as a morpheme and a phrase, and may match the identified meaning of the word and a domain and intent, thereby determining the intent of the user. For example, the natural language understanding module 220 may calculate how often the word extracted from the user input is included in each domain and each intention, thereby determining the intent of the user. According to various embodiments, the natural language understanding module 220 may determine a parameter of the user input using the word on the basis of which the intent is identified. According to various embodiments, the natural language understanding module 220 may determine the intent of the user using the natural language understanding database 221, which stores linguistic features for determining the intent of user input. According to other embodiments, the natural language understanding module 220 may determine the intent of the user using a personal language model (PLM). For example, the natural language understanding module 220 may determine the intent of the user using personal information (e.g., a contact list or a music list). The personal language model may be stored, for example, in the natural language understanding database 221. According to certain embodiments, not only the natural language understanding module 220 but also the automatic speech recognition module 210 may recognize the voice of the user with reference to the personal language model stored in the natural language understanding database 221.

According to certain embodiments of the disclosure, the natural language understanding module 220 may generate a path rule on the basis of the intent of the user input and the parameter. For example, the natural language understanding module 220 may select an app to be executed on the basis of the intent of the user input and may determine an action to be performed in the selected app. The natural language understanding module 220 may determine a parameter corresponding to the determined action and may thus generate a path rule. According to certain embodiments, the path rule generated by the natural language understanding module 220 may include information about an app to be executed, an action (e.g., at least one state) to be executed in the app, and a parameter utilized to execute the action.

According to certain embodiments of the disclosure, the natural language understanding module 220 may generate one path rule or a plurality of path rules on the basis of the intent of the user input and the parameter. For example, the natural language understanding module 220 may receive a path rule set corresponding to the electronic device 100 from the path planner module 230 and may map the intent of the user input and the parameter to the received path rule set, thereby determining a path rule.

According to certain embodiments of the disclosure, the natural language understanding module 220 may generate one path rule or a plurality of path rules by determining an app to be executed, an action to be executed in the app, and a parameter utilized to execute the action on the basis of the intent of the user input and the parameter. For example, the natural language understanding module 220 may arrange the app to be executed and the action to be executed in the app in an ontological form or in the form of a graph model according to the intent of the user input using information about the electronic device 100, thereby generating a path rule. The generated path rule may be stored, for example, in a path rule database (PR DB) 231 through the path planner module 230. The generated path rule may be added to a path rule set in the database 231.

According to certain embodiments of the disclosure, the natural language understanding module 220 may select at least one path rule from among the plurality of generated path rules. For example, the natural language understanding module 220 may select an optimal path rule from among the plurality of path rules. In another example, the natural language understanding module 220 may select a plurality of path rules when some actions are specified on the basis of the user utterance. The natural language understanding module 220 may determine one path rule among the plurality of path rules by additional user input.

According to certain embodiments of the disclosure, the natural language understanding module 220 may transmit a path rule to the electronic device 100 upon request with respect to the user input. For example, the natural language understanding module 220 may transmit one path rule corresponding to the user input to the electronic device 100. In another example, the natural language understanding module 220 may transmit a plurality of path rules corresponding to the user input to the electronic device 100. The plurality of path rules may be generated by the natural language understanding module 220, for example, when some actions are specified on the basis of the user utterance (e.g., less than an entirety of the possible actions).

According to certain embodiments of the disclosure, the path planner module 230 may select at least one path rule from among a plurality of path rules.

According to certain embodiments of the disclosure, the path planner module 230 may transmit a path rule set including a plurality of path rules to the natural language understanding module 220. The plurality of path rules of the path rule set may be stored in a table in the path rule database 231 connected to the path planner module 230. For example, the path planner module 230 may transmit a path rule set corresponding to the information (e.g., OS information or app information) about the electronic device 100, received from an intelligent agent 145, to the natural language understanding module 220. The table stored in the path rule database 231 may be stored, for example, by domain or domain version.

According to certain embodiments of the disclosure, the path planner module 230 may select one path rule or a plurality of path rules from a path rule set and may transmit the selected path rule or path rules to the natural language understanding module 220. For example, the path planner module 230 may match the intent of the user and the parameter with the path rule set corresponding to the electronic device 100, may select one path rule or a plurality of path rules, and may transmit the selected path rule or path rules to the natural language understanding module 220.

According to certain embodiments of the disclosure, the path planner module 230 may generate one path rule or a plurality of path rules using the intent of the user and the parameter. For example, the path planner module 230 may determine an app to be executed and an action to be executed in the app on the basis of the intent of the user and the parameter and may generate one path rule or a plurality of path rules. According to certain embodiments, the path planner module 230 may store the generated path rule in the path rule database 231.

According to certain embodiments of the disclosure, the path planner module 230 may store the path rule generated by the natural language understanding module 220 in the path rule database 231. The generated path rule may be added to a path rule set stored in the path rule database 231.

According to certain embodiments of the disclosure, the table stored in the path rule database 231 may include a plurality of path rules or a plurality of path rule sets. The plurality of path rules or the plurality of path rule sets may reflect the kind, version, type, or characteristics of the device that performs each path rule.

According to certain embodiments of the disclosure, the dialog manager module 240 may determine whether the intent of the user identified by the natural language understanding module 220 is clear. For example, the dialog manager module 240 may determine whether the intent of the user is clear on the basis of whether parameter information is sufficient. The dialog manager module 240 may determine whether the parameter identified by the natural language understanding module 220 is sufficient to perform a task. According to certain embodiments, when the intent of the user is not clear, the dialog manager module 240 may provide feedback to request utilized information from the user. For example, the dialog manager module 240 may provide feedback requesting parameter information for determining the intent of the user.

According to certain embodiments of the disclosure, the dialog manager module 240 may include a content provider module. The content provider module may generate the result of performing a task corresponding to the user input when an action can be performed on the basis of the intent and the parameter identified by the natural language understanding module 220. According to certain embodiments, the dialog manager module 240 may transmit the result generated by the content provider module to the electronic device 100 in response to the user input.

According to certain embodiments of the disclosure, the natural language generator module (NLG) 250 may change specified information into a text form. The information changed into the text form may be a natural language utterance form. The specified information may be, for example, information about additional input, information indicating completion of an action corresponding to user input, or information indicating additional user input (e.g., feedback information about user input). The information changed into the text form may be transmitted to the electronic device 100 to be displayed on the display 120, or may be transmitted to the text-to-speech module 260 to be changed into a voice form.

According to certain embodiments of the disclosure, the text-to-speech module 260 may change information in a text form into information in a voice form. The text-to-speech module 260 may receive information in a text form from the natural language generator module 250, may change the information in the text form into information in a voice form, and may transmit the information in the voice form to the electronic device 100. The electronic device 100 may output the information in the voice form through a speaker 130.

According to certain embodiments of the disclosure, the natural language understanding module 220, the path planner module 230, and the dialog manager module 240 may be configured as a single module. For example, the natural language understanding module 220, the path planner module 230, and the dialog manager module 240 may be configured as a single module to determine the intent of the user and a parameter and to generate a response (e.g., a path rule) corresponding to the determined intent of the user and parameter. The generated response may be transmitted to the electronic device 100.

Figure 6:
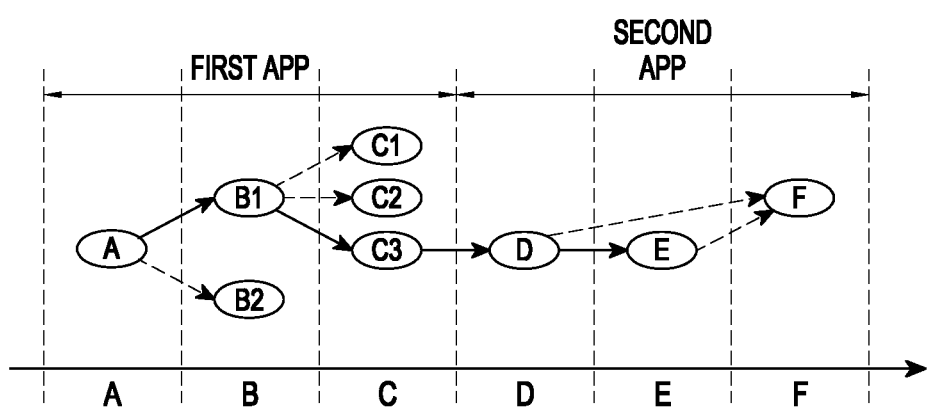
FIG. 6 is an example diagram for describing a method of generating operation information in a path planner module according to various embodiments of the disclosure.

FIG. 6 is an example diagram for describing a method in which a path planner module generates a path rule according to certain embodiments of the disclosure.

Referring to FIG. 6, according to certain embodiments, a natural language understanding module 220 may classify a function of an app as one action (e.g., state A to state F) and may store the action in a path rule database 231. For example, the natural language understanding module 220 may store a path rule set including a plurality of path rules A-B1-C1, A-B1-C2, A-B1-C3-D-F, and A-B-C3-D-E-F classified as one action (e.g., state) in the path rule database 231.

According to certain embodiments of the disclosure, the path rule database 231 of the path planner module 230 may store a path rule set for performing a function of an app. The path rule set may include a plurality of path rules including a plurality of actions (e.g., a sequence of states). According to the plurality of path rules, a plurality of actions executed according to parameters input for the respective actions may be sequentially arranged. According to certain embodiments, the plurality of path rules may be configured in an ontological form or in the form of a graph model, and may be stored in the path rule database 231.

According to certain embodiments of the disclosure, the natural language understanding module 220 may select an optimal path rule A-B1-C3-D-F corresponding to the intent of user input and a parameter from among the plurality of path rules A-B1-C1, A-B1-C2, A-B1-C3-D-F, and A-B1-C3-D-E-F.

According to certain embodiments of the disclosure, when there is no path rule that optimally matches the user input, the natural language understanding module 220 may transmit a plurality of rules to an electronic device 100. For example, the natural language understanding module 220 may select a path rule (e.g., A-B1) partially corresponding to the user input. The natural language understanding module 220 may select one or more path rules (e.g., A-B1-C1, A-B1-C2, A-B1-C3-D-F, and A-B1-C3-D-E-F) including the path rule (e.g., A-B1) partially corresponding to the user input and may transmit the one or more path rules to the electronic device 100.

According to certain embodiments of the disclosure, the natural language understanding module 220 may select one of the plurality of path rules on the basis of additional input of the electronic device 100 and may transmit the selected one path rule to the electronic device 100. For example, the natural language understanding module 220 may select one path rule (e.g., A-B1-C3-D-F) from among the plurality of path rules (e.g., A-B1-C1, A-B1-C2, A-B1-C3-D-F, and A-B1-C3-D-E-F) according to user input (e.g., input to selected C3) additionally made in the electronic device 100 and may transmit the selected path rule to the electronic device 100.

According to certain embodiments of the disclosure, the natural language understanding module 220 may determine user intent and a parameter corresponding to the user input (e.g., the input to select C3) additionally made in the electronic device 100 through the natural language understanding module 220 and may transmit the determined user intent and parameter to the electronic device 100. The electronic device 100 may select one path rule (e.g., A-B1-C3-D-F) from among the plurality of path rules (e.g., A-B1-C1, A-B1-C2, A-B1-C3-D-F, and A-B1-C3-D-E-F) on the basis of the transmitted intent or parameter.

Accordingly, the electronic device 100 may complete the action of the app 141 or 143 according to the selected one path rule.

According to certain embodiments of the disclosure, when user input lacking information is received by an intelligent server 200, the natural language understanding module 220 may generate a path rule partially corresponding to the received user input. For example, the natural language understanding module 220 may transmit the partially corresponding path rule to an intelligent agent 145. A processor 150 may execute the intelligent agent 145 to receive the path rule and may transmit the partially corresponding path rule to an execution manager module 147. The processor 150 may execute a first app 141 according to the path rule through the execution manager module 147. The processor 150 may transmit information about a lacking parameter to the intelligent agent 145 while executing the first app 141 through the execution manager module 147. The processor 150 may request additional input from the user through the intelligent agent 145 using the information about the lacking parameter. When additional input is received from the user through the intelligent agent 145, the processor 150 may transmit the user input to the intelligent server 200 for processing. The natural language understanding module 220 may generate an additional path rule on the basis of the intent of the additional user input and the information about the parameter and may transmit the additional path rule to the intelligent agent 145. The processor 150 may transmit the path rule to the execution manager module 147 through the intelligent agent 145 and may execute a second app 143.

According to certain embodiments of the disclosure, when user input with some information missing is received by the intelligent server 200, the natural language understanding module 220 may transmit a user information request to a personal information server 300. The personal information server 300 may transmit information about the user who performs the user input, which is stored in a persona database, to the natural language understanding module 220. The natural language understanding module 220 may select a path rule corresponding to the user input with some information missing using the information about the user. Accordingly, even though user input with some information missing is received by the intelligent server 200, the natural language understanding module 220 may receive additional input by requesting the missing information or may determine a path rule corresponding to the user input using user information.

Table 1 below may show illustrative examples of path rules related to a task requested by the user according to various embodiments.

TABLE 1

| Path rule ID | State | Parameter |
|---|---|---|
| Gallery_101 | PictureView (25) | NULL |
| | SearchView (26) | NULL |
| | SearchViewResult (27) | Location, time |
| | SearchEmptySelectedView (28) | NULL |
| | SearchSelectedView (29) | ContentType, selectall |
| | CrossShare (30) | anaphora |

Referring to Table 1, a path rule generated or selected by an intelligent server (the intelligent server 200 in FIG. 1) according to a user utterance (e.g., "Share the picture") may include at least one state 25, 26, 27, 28, 29, or 30. For example, the at least one state (e.g., any one operation state of a terminal) may correspond to at least one of execution of a picture application (PictureView) 25, execution of a picture search function (SearchView) 26, display of a search result display screen (SearchViewResult) 27, display of a search result display screen with no picture selected (SearchEmptySelectedView) 28, display of a search result display screen with at least one picture selected (SearchSelectedView) 29, or display of a shared application selection screen (CrossShare) 30.

According to certain embodiments of the disclosure, parameter information of the path rule may correspond to at least one state. For example, the parameter information may be included in the state of the display of the search result display screen with the at least one picture selected 29.

When the path rule including a sequence of the states 25, 26, 27, 28, and 29 is executed, a task (e.g., "Share this picture!") requested by the user may be performed.

Figure 7:
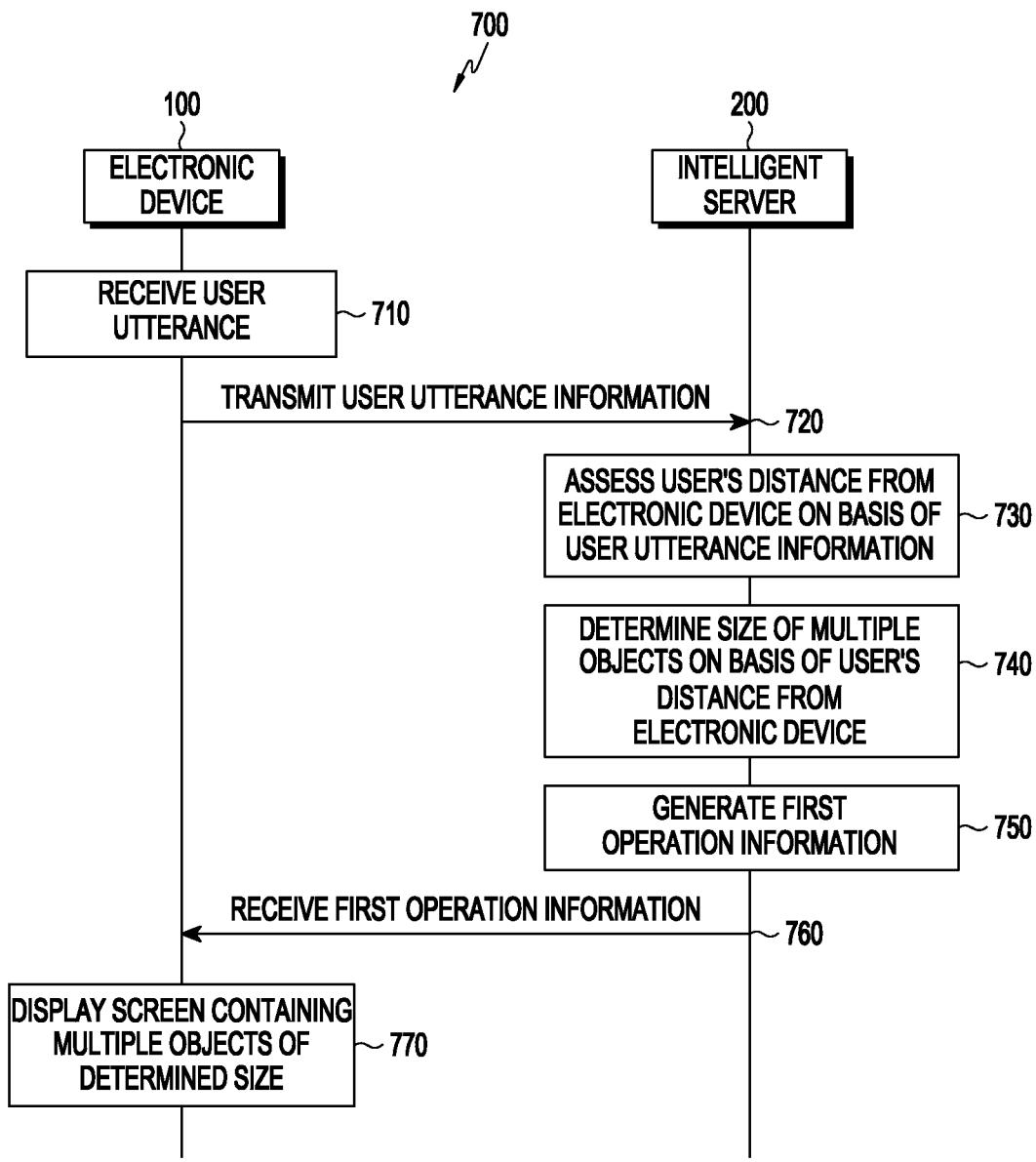
FIG. 7 is an example diagram for describing an operation of displaying a first screen according to a user utterance in an electronic device according to certain embodiments of the disclosure.

FIG. 7 is an example diagram 700 for describing an operation of displaying a first screen according to a user utterance in an electronic device 100 (e.g., an electronic device 1701 in FIG. 17) according to certain embodiments of the disclosure.

Some of operations described as being performed by an intelligent server 200 in FIG. 7 may also be performed by the electronic device 100. Alternatively, all of the operations performed by the intelligent server 200 may also be performed by the electronic device 100. In this case, the electronic device 100 may individually perform all operations except for an operation (e.g., 720 and 760) representing transmission/reception of information in FIG. 7 without transmitting information to another electronic device or receiving information from another electronic device. This may be equally applied to other flowcharts.

Referring to FIG. 7, an electronic device (e.g., a processor 150 in FIG. 2) according to certain embodiments of the disclosure may receive a user utterance in operation 710. The electronic device (e.g., the processor 150 in FIG. 2) according to certain embodiments of the disclosure may convert an utterance of a user into a voice signal through at least one microphone (e.g., a microphone 301 in FIG. 3). The user utterance according to certain embodiments of the disclosure may include, for example, a command for executing (or performing) a specific function (or task) by using a specific application. The user utterance according to certain embodiments of the disclosure may include a wake-up utterance (e.g., "Hi, Bixby") for executing an intelligent agent (e.g., an intelligent agent 145 in FIG. 2) for receiving the command for executing the specific function.

The electronic device (e.g., the processor 150 in FIG. 2) according to certain embodiments of the disclosure may transmit user utterance information to the intelligent server 200 in operation 720. The electronic device (e.g., the processor 150 in FIG. 2) according to certain embodiments of the disclosure may transmit, to the intelligent server 200, information about the user utterance by using a communication circuit (e.g., a communication module 1790 in FIG. 17). For example, the information about the user utterance may include voice data for the received user utterance.

In operation 730, the intelligent server 200 according to certain embodiments of the disclosure may identify a distance between the user and the electronic device 100 based on the user utterance information. The intelligent server 200 according to certain embodiments of the disclosure may detect a magnitude (strength) of the user utterance (i.e., a magnitude of a signal gain) from the voice data for the received user utterance. The intelligent server 200 according to certain embodiments of the disclosure may identify the distance where the user is located from the electronic device 100 based on the detected magnitude (strength) of the user utterance. A distance according to certain embodiments of the disclosure may mean a distance from a microphone (e.g., a microphone 301 in FIG. 3) to a point where a user is located.

In operation 740, the intelligent server 200 according to certain embodiments of the disclosure may determine a size of a plurality of objects based on the distance where the user is located from the electronic device 100. The size of the plurality of objects according to certain embodiments of the disclosure may mean a size of a plurality of objects displayed on a display (e.g., a display 120 in FIG. 2). For example, the intelligent server according to certain embodiments of the disclosure may determine the size of the plurality of objects as a first size if the distance where the user is located from the electronic device 100 is longer than a preset distance (e.g., 5 m), and determine the size of the plurality of objects as a second size which is shorter than the first size if the distance where the user is located from the electronic device 100 is shorter than the preset distance (e.g., 5 m). Alternatively, the size of the plurality of objects may be implemented in three or more various sizes.

The intelligent server 200 according to certain embodiments of the disclosure may generate first operation information in operation 750. The first operation information according to certain embodiments of the disclosure may include a pass rule (e.g., a pass rule in FIG. 5) generated from voice data for a user utterance received by using a natural language understanding module (e.g., an NLU module 220 in FIG. 5). For example, the pass rule according to certain embodiments of the disclosure may include information about an application to be executed based on user utterance information or an operation to be performed in the application.

The electronic device 100 according to certain embodiments of the disclosure may receive the first operation information from the intelligent server 200 in operation 760. The electronic device (e.g., the processor 150 in FIG. 2) according to certain embodiments of the disclosure may receive the first operation information from the intelligent server 200 by using the communication circuit (e.g., the communication module 1790 in FIG. 17). The electronic device (e.g., the processor 150 in FIG. 2) according to certain embodiments of the disclosure may receive, from the intelligent server 200, information indicating an operation of adjusting a size of each of the plurality of objects determined in operation 730.

The electronic device 100 according to certain embodiments of the disclosure may display a screen including the plurality of objects which are based on the determined size in operation 770. The electronic device 100 according to certain embodiments of the disclosure may display the plurality of objects in the determined size (e.g., the first size or the second size) on the display (e.g., the display 120 in FIG. 2).

According to certain embodiments of the disclosure, at least one of the above-described operations 730 and 740 may be performed by a processor (e.g., the processor 150 in FIG. 2) of the electronic device 100, and at least some of the operations 710 to 770 may be omitted.

Figure 8A:
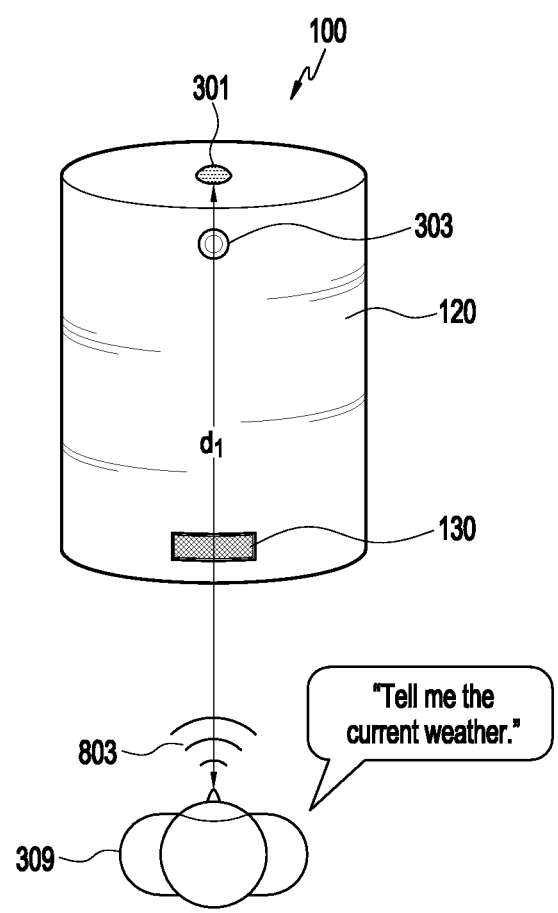
FIG. 8a is an example diagram for describing an operation of displaying a first screen based on a distance where a user is located from an electronic device which is identified from a user utterance in the electronic device according to certain embodiments of the disclosure.
Figure 8B:
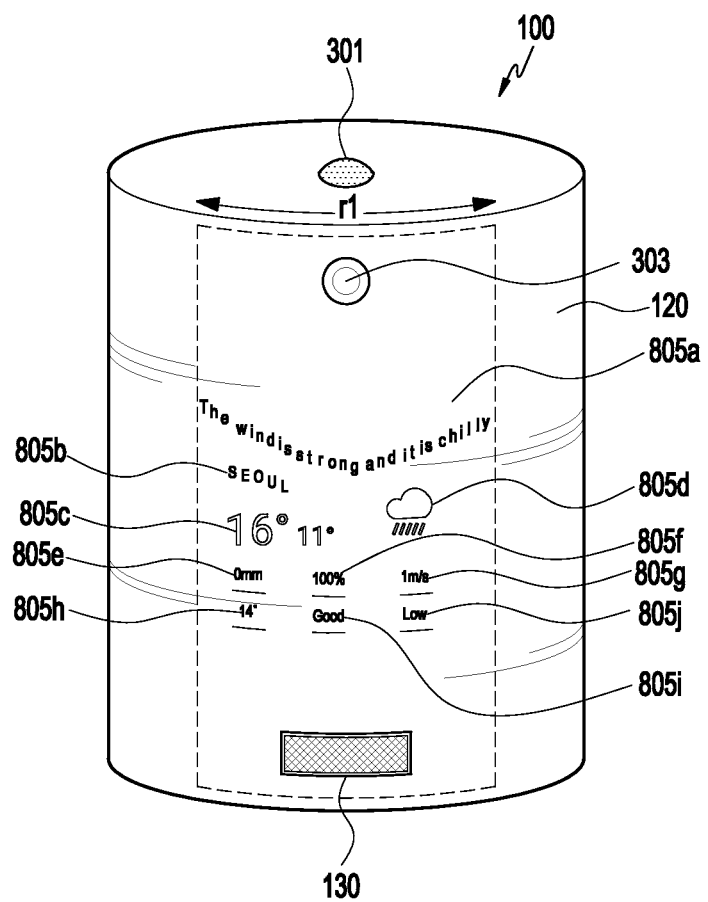
FIG. 8b is an example diagram for describing an operation of displaying a first screen based on a distance where a user is located from an electronic device which is identified from a user utterance in the electronic device according to certain embodiments of the disclosure.
Figure 8C:
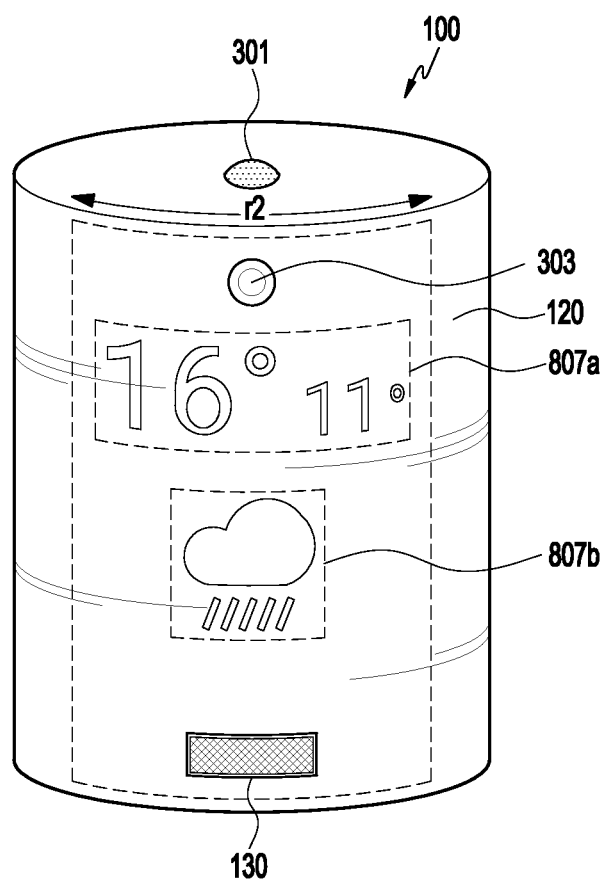
FIG. 8c is an example diagram for describing an operation of displaying a first screen based on a distance where a user is located from an electronic device which is identified from a user utterance in the electronic device according to certain embodiments of the disclosure.

FIGS. 8a to 8c are example diagrams for describing an operation of displaying a first screen based on a distance where a user is located from an electronic device 100 which is identified from a user utterance in the electronic device (e.g., a processor 150 in FIG. 2) according to certain embodiments of the disclosure.

Referring to FIG. 8a, the electronic device 100 (e.g., an electronic device 1701 in FIG. 17) according to certain embodiments of the disclosure may include at least one of a microphone 301, a camera 303, a display 120, a speaker 130, or a communication circuit (not shown) (e.g., a communication module 1790 in FIG. 17).

The electronic device 100 according to certain embodiments of the disclosure may receive a user utterance 803 (e.g., "Tell me the current weather.") from a user 309 through the microphone 301.

The electronic device 100 according to certain embodiments of the disclosure may transmit, to an intelligent server (e.g., an intelligent server 200 in FIG. 1), information about the user utterance by using the communication circuit (e.g., the communication module 1790 in FIG. 17).

The electronic device 100 according to certain embodiments of the disclosure may receive, from the intelligent server (e.g., the intelligent server 200 in FIG. 1), first operation information (e.g., first operation information in FIG. 7) and information about a size of a plurality of objects. The first operation information according to certain embodiments of the disclosure may include information about at least one of an application (e.g., a weather application) which corresponds to the utterance 803 (e.g., "Tell me the current weather") of the user or an operation to be performed in the application (e.g. display of a screen for the current weather in the weather application). The electronic device 100 according to certain embodiments of the disclosure may receive, from the intelligent server (e.g., the intelligent server 200 in FIG. 1), information about a size of the plurality of objects which is determined based on a distance (e.g., $d_1$) where the user is located from the intelligent server (e.g., the intelligent server 200 in FIG. 1).

Referring to FIG. 8b, an electronic device 100 according to certain embodiments of the disclosure may execute an application (e.g., a weather application) according to received first operation information (e.g., first operation information in FIG. 7), and perform a specific task (e.g., a task of displaying a screen for the current weather) in the executed application (e.g., the weather application). The device 100 according to certain embodiments of the disclosure may display a plurality of objects 805a to 805j on a display 120. The electronic device 100 according to certain embodiments of the disclosure may display a first screen including the plurality of objects 805a to 805j of a second size (e.g., a second size in FIG. 7) if a distance (e.g., $d_1$ in FIG. 8a) where a user 309 is located from the electronic device 100 is shorter than or equal to a preset distance (e.g., 5 m).

The first screen including the plurality of objects 805a to 805j according to certain embodiments of the disclosure may be displayed on at least a partial area (e.g., an area whose arc length is of the display 120. The at least partial area (or the arc length r1) according to certain embodiments of the disclosure may be determined based on information about a size (e.g., the second size) of the plurality of objects.

The first screen according to certain embodiments of the disclosure may be displayed on the display 120 in a direction which corresponds to a direction where the user 309 is located from the electronic device 100. For example, a direction where the first screen and a second screen are displayed may correspond to (or match) a direction where a user utterance (e.g., "Tell me the current weather.") is received from the user 309 in FIG. 8a.

The plurality of objects according to certain embodiments of the disclosure may include at least one of the first object 805a, the second object 805b, the third object 805c, the fourth object 805d, the fifth object 805e, the sixth object 805f, the seventh object 805g, the eighth object 805h, the ninth object 805i, or the tenth object 805j. The plurality of objects 805a to 805j may indicate, in order, outdoor weather information, area information, highest/lowest temperature information, rainfall information, precipitation information, humidity information, wind information, sensible temperature information, fine dust concentration information, and ultraviolet ray information, respectively. The above-described information indicated by the plurality of objects is example, and at least some of the above-described information may be omitted or the above-described information may further include other information.

The electronic device 100 according to certain embodiments of the disclosure may output a voice message for at least one of the information indicated by the plurality of objects 805a to 805j through a speaker 130. For example, the electronic device 100 according to certain embodiments of the disclosure may output, through the speaker 130, a voice message "The wind is strong and it is chilly."

Referring to FIG. 8c, an electronic device 100 according to certain embodiments of the disclosure may display, on a display 120, a second screen including a plurality of objects 807a and 807b of a first size (e.g., a first size in FIG. 7) which is greater than a second size (e.g., a second size in FIG. 8b) if a distance where a user 309 is located from the electronic device 100 (e.g., $d_1$ in FIG. 8a) is longer than a preset distance (e.g., 5 m). The plurality of objects 807a and 807b of the second size according to certain embodiments of the disclosure may include at least one of a plurality of objects 805a to 805j of the first size in FIG. 8b. For example, an eleventh object 807a and a twelfth object 807b may correspond to the third object 805c and the fourth object 805d in FIG. 8b, respectively.

The second screen according to certain embodiments of the disclosure may be displayed on at least a partial area (e.g., an area whose arc length is $r_2$) of the display 120. Here, the arc length $r_2$ may be longer than an arc length $r_1$ in FIG. 8b. The at least partial area (or the arc length $r_1$) according to certain embodiments of the disclosure may be determined based on information about a size (e.g., the second size) of the plurality of objects (i.e., based on the distance where the user 309 is located from the electronic device 100).

The second screen according to certain embodiments of the disclosure may include objects (e.g., 807a and 807b) whose number is less than the number (e.g., 10) of objects included in a first screen in FIG. 8b. According to certain embodiments of the disclosure, the number of the plurality of objects illustrated in FIG. 8b or FIG. 8c may be preset according to the size (the first and second sizes) of the plurality of objects.

The plurality of objects 807a and 807b included in the second screen according to certain embodiments of the disclosure may be displayed in an arrangement which is different from an arrangement in which a plurality of objects 805a to 805j in FIG. 8b is displayed on the display 120. According to certain embodiments of the disclosure, the arrangements of the plurality of objects illustrated in FIG. 8b or 8c may be preset according to the size (the first and second sizes) of the plurality of objects.

As described above with reference to FIGS. 8b and 8c, an electronic device 100 according to certain embodiments of the disclosure may display, according to a distance where a user is located from the electronic device 100, a plurality of objects by varying at least one of a size of the plurality of objects, a size (or a length of an arc) of an area where a screen is displayed, the number of the plurality of objects which are displayed on the screen, or an arrangement of the plurality of objects.

The electronic device 100 according to certain embodiments of the disclosure, as described above with reference to FIG. 8b, may output, as a voice through a speaker 130, information indicated by at least one of a plurality of objects 807a and 807b displayed, and may output information indicated by at least one of non-displayed information (e.g., 805a, 805b, and 807e to 807j in FIG. 8b) as a voice.

According to certain embodiments of the disclosure, a plurality of objects displayed in FIGS. 8a to 8c may be objects for which a curved surface distortion correction described with reference to FIGS. 4a and 4b is performed.

Figure 9A:
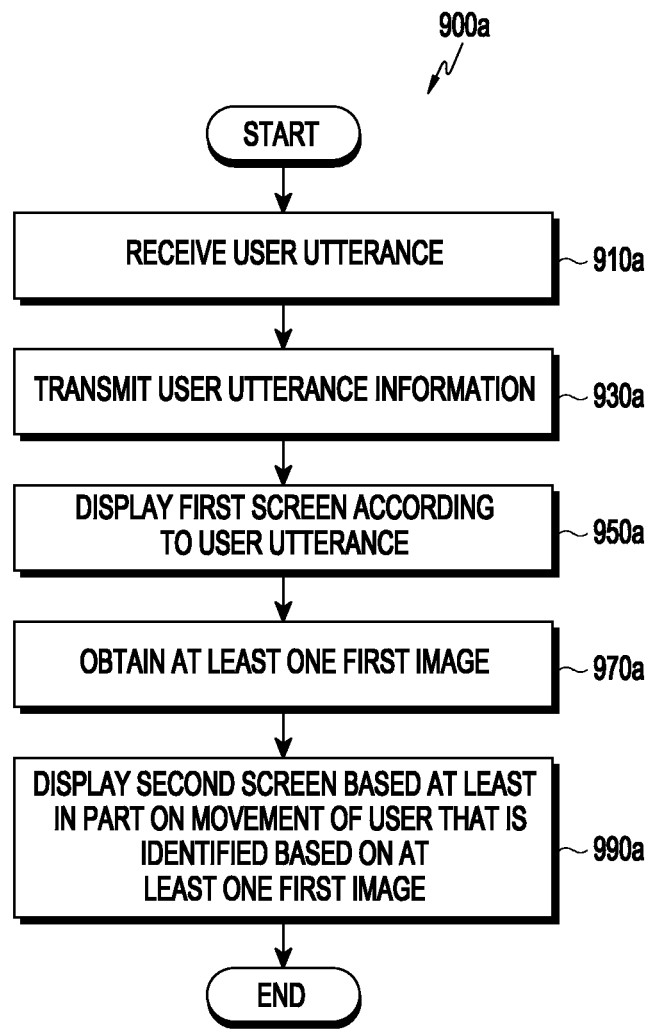
FIG. 9a is an example diagram for describing an operation of displaying a second screen based on a distance where a user is located from an electronic device which is identified from at least one first image in the electronic device according to certain embodiments of the disclosure.
Figure 9B:
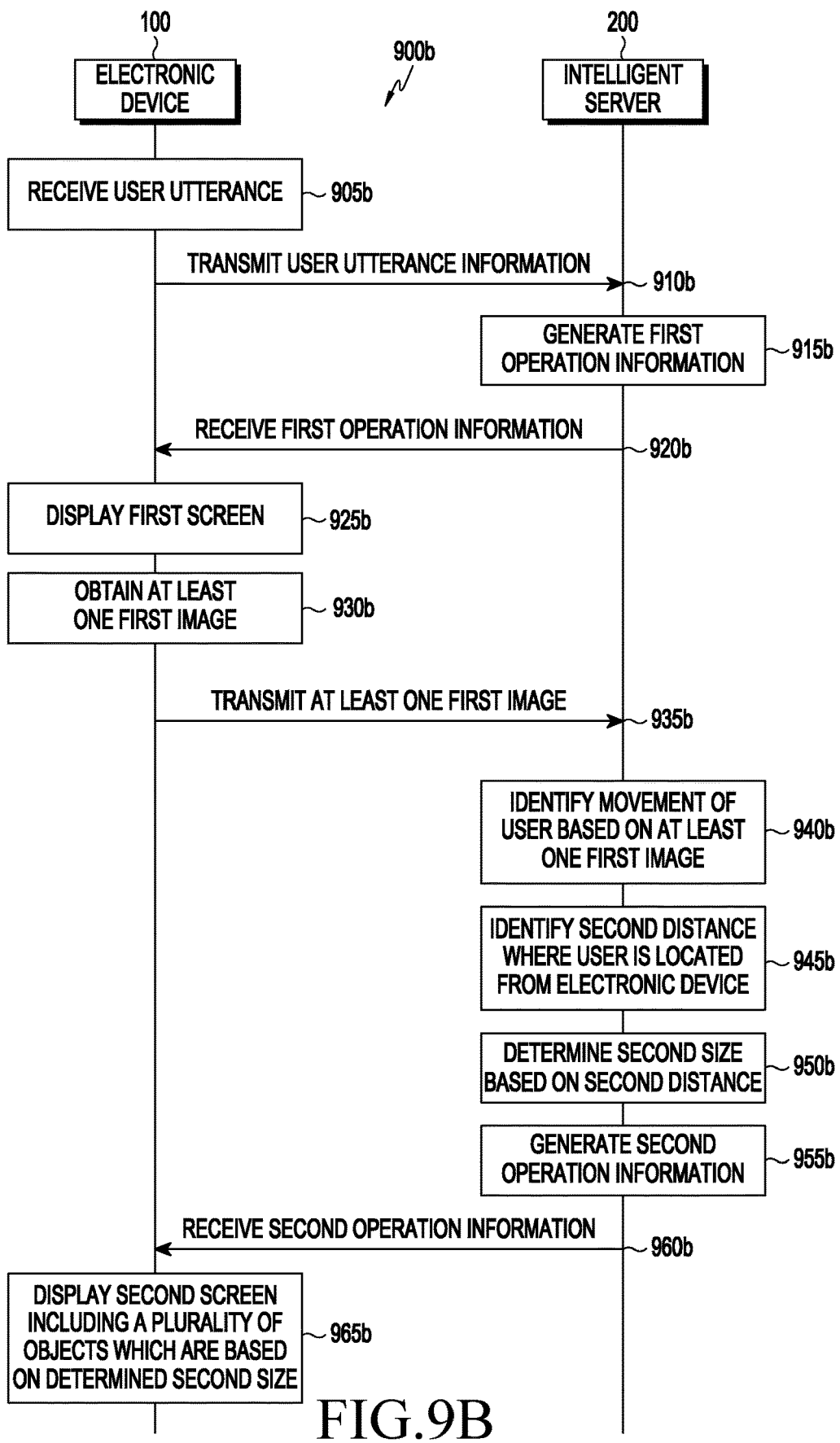
FIG. 9b is an example diagram for describing an operation of displaying a second screen based on a distance where a user is located from an electronic device which is identified from at least one first image in the electronic device according to certain embodiments of the disclosure.

FIGS. 9a and 9b are example diagrams 900a and 900b for describing an operation of displaying a second screen based on a distance where a user is located from an electronic device 100 (e.g., an electronic device 1701 in FIG. 17) which is identified from at least one first image in the electronic device 100 according to certain embodiments of the disclosure.

Referring to FIG. 9a, an electronic device 100 according to certain embodiments of the disclosure may receive a user utterance in operation 910a. The electronic device 100 according to certain embodiments of the disclosure may receive an utterance of a user through a microphone (e.g., a microphone 301 in FIG. 3).

The electronic device 100 according to certain embodiments of the disclosure may transmit user utterance information in operation 930a. The electronic device 100 according to certain embodiments of the disclosure may transmit, to an intelligent server (e.g., an intelligent server 200 in FIG. 1), information about the utterance of the user by using a communication circuit (e.g., a communication module 1790 in FIG. 17).

The electronic device 100 according to certain embodiments of the disclosure may display a first screen according to the user utterance in operation 950a. The first screen according to certain embodiments of the disclosure may include a plurality of objects. The displayed number, a size of a displayed area, or a displayed arrangement of the plurality of objects included in the first screen according to certain embodiments of the disclosure may be determined based on a magnitude of the user utterance.

The electronic device 100 according to certain embodiments of the disclosure may obtain at least one first image in operation 970a. The electronic device 100 according to certain embodiments of the disclosure may obtain the at least one first image by a camera (e.g., a camera 303 in FIG. 3). The at least one first image according to certain embodiments of the disclosure may include an image or a picture photographed by the camera (e.g., the camera 303 in FIG. 3).

In operation 990a, the electronic device 100 according to certain embodiments of the disclosure may display a second screen based on at least part of movement of a user which is identified based on the at least one first image. The second screen according to certain embodiments of the disclosure may mean a screen in which at least part of a characteristic of the first screen or a characteristic of a plurality of objects included in the first screen is changed. For example, at least one of a direction where the second screen is displayed and a size of an area where the second screen is displayed may be different from at least one of a direction where the first screen is displayed and a size of an area where the first screen is displayed. At least one of the number, a size, and an arrangement of a plurality of objects included in the second screen may be different from at least one of the number, a size, and an arrangement of a plurality of objects included in the first screen. The displayed number, a size of a displayed area, or a displayed arrangement of the plurality of objects included in the second screen according to certain embodiments of the disclosure may be determined based on the magnitude of the user utterance or the at least one first image.

Referring to FIG. 9b, an electronic device 100 according to certain embodiments of the disclosure may receive a user utterance in operation 905b.

The electronic device 100 according to certain embodiments of the disclosure may transmit user utterance information to an intelligent server 200 in operation 910b.

The intelligent server 200 according to certain embodiments of the disclosure may generate first operation information in operation 915b. The first operation information according to certain embodiments of the disclosure may include first operation information according to operations 730 to 750 described above with reference to FIG. 7.

The electronic device 100 according to certain embodiments of the disclosure may receive the first operation information from the intelligent server 200 in operation 920b. The electronic device 100 according to certain embodiments of the disclosure may receive information about a first screen (or information about a size of a plurality of objects included in the first screen). The size of the plurality of objects according to certain embodiments of the disclosure may be determined based on a distance (a first distance) where a user is located from the electronic device 100 which is identified based on the user utterance information.

The electronic device 100 according to certain embodiments of the disclosure may display the first screen in operation 925b. The first screen according to certain embodiments of the disclosure may include a first screen according to operation 770 described above with reference to FIG. 7.

The electronic device 100 according to certain embodiments of the disclosure may obtain at least one first image in operation 930b. The electronic device 100 according to certain embodiments of the disclosure may obtain the at least one first image by a camera (e.g., a camera 303 in FIG. 3). The least one first image according to certain embodiments of the disclosure may include an image for a user located around the electronic device 100.

The electronic device 100 according to certain embodiments of the disclosure may transmit the at least one first image in operation 935b. The electronic device 100 according to certain embodiments of the disclosure may transmit the at least one first image to the intelligent server 200 by using a communication circuit (e.g., a communication module 1790 in FIG. 17).

In operation 940b, the intelligent server 200 according to certain embodiments of the disclosure may identify movement of the user based on the at least one first image. For example, the movement of the user may include at least one of a change in a distance (e.g., moving away or closer) where the user is located, a change in a direction (e.g., moving to the left or the right), and a change in a height (e.g., increase or decrease in the height) of the user being located with respect to the electronic device 100. An operation of identifying the movement of the user in the intelligent server 200 according to certain embodiments of the disclosure may be performed by an operation of recognizing an object (e.g., a face of the user) within an image based on a deep learning technology, or may be performed by various other technologies.

The intelligent server 200 according to certain embodiments of the disclosure may identify a second distance where the user is located from the electronic device 100 in operation 945b. The second distance according to certain embodiments of the disclosure may mean a distance changed from the first distance due to the movement of the user. The second distance according to certain embodiments of the disclosure may be identified from the movement of the user identified in operation 940b.

The intelligent server 200 according to certain embodiments of the disclosure may determine a second size based on the second distance in operation 950b. The second size according to certain embodiments of the disclosure may mean a changed size of the plurality of objects to be displayed on the display 120. The second size according to certain embodiments of the disclosure may correspond to a first size described above with reference to FIG. 8b if the identified second distance is shorter than a preset distance (e.g., 5 m), and correspond to a second size described above with reference to FIG. 8c if the identified second distance is longer than the preset distance (e.g., 5 m).

The intelligent server 200 according to certain embodiments of the disclosure may generate second operation information in operation 955b. The second operation information according to certain embodiments of the disclosure may be generated based on a second distance identified from a received at least one image. The second operation information according to certain embodiments of the disclosure may include a pass rule for changing a screen (the first screen) displayed on the display 120 to the second screen to display the second screen.

The electronic device 100 according to certain embodiments of the disclosure may receive the second operation information in operation 960b. The electronic device 100 according to certain embodiments of the disclosure may receive the second operation information from the intelligent server 200 by using the communication circuit (e.g., the communication module 1790 in FIG. 17).

The electronic device 100 according to certain embodiments of the disclosure may display the second screen including a plurality of objects which are based on the determined second size in operation 965b. For example, if the second size corresponds to a first size described with reference to FIG. 8b, the electronic device 100 according to certain embodiments of the disclosure may display the plurality of objects as illustrated in FIG. 8b. If the second size corresponds to a second size described above with reference to FIG. 8c, the electronic device 100 according to certain embodiments of the disclosure may display the plurality of objects as illustrated in FIG. 8c.

If the movement of the user is not identified in operation 940b, or a difference between the second distance identified in operation 945b and the distance (e.g., the first distance) identified in operation 915b (i.e., operation 740 in FIG. 7) is not large, the aforementioned operations 950b to 965b may be omitted. For example, a fact that the distance (e.g., the first distance) identified in operation 915b (i.e., operation 740 in FIG. 7) is not large may mean a case that all of the first and second distances are shorter than the preset distance (e.g., 5 m) or all of the first and second distances are longer than the preset distance (e.g., 5 m).

According to certain embodiments of the disclosure, at least one of operation 915b or operations 940b to 955b may be also performed in the electronic device 100, and at least some of the above-described operations 905b to 965b may be omitted.

Figure 10:
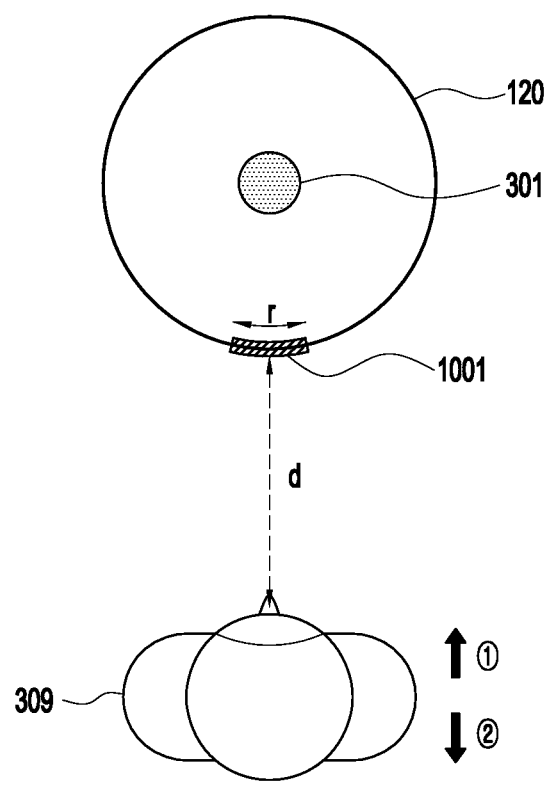
FIG. 10 is an example diagram for describing an operation of changing a displayed screen to display the changed screen in an electronic device if a distance where a user is located from the electronic device is changed according to certain embodiments of the disclosure.

FIG. 10 is an example diagram for describing an operation of changing a displayed screen (e.g., 1001) to display the changed screen in an electronic device 100 if a distance d where a user 309 is located from the electronic device 100 is changed according to certain embodiments of the disclosure.

If a distance where the user 309 is located from the electronic device 100 is d (m), the electronic device 100 according to certain embodiments of the disclosure may display a screen 1001 including a plurality of objects on at least a partial area (e.g., an area whose arc length is r) of the display 120.

The electronic device 100 according to certain embodiments of the disclosure may change the displayed screen 1001 based on movement (e.g., ①or ②) of the user 309 which is detected based on at least one image obtained by a camera (not shown). An operation of changing the displayed screen 1001 based on the movement (e.g., ① or ②) of the user 309 by the electronic device 100 according to certain embodiments of the disclosure may be performed by operations 935b to 965b described above with reference to FIG. 9. According to certain embodiments of the disclosure, an operation of detecting the movement (e.g., ① or ②) of the user 309 which is detected based on the at least one image which is obtained by the camera (not shown) (e.g., a camera 303 in FIG. 3) may be performed by an intelligent server (e.g., an intelligent server 200 in FIG. 1) or the electronic device (e.g., a processor 150 in FIG. 2).

If the distance d is shorter than a preset distance (e.g., 5 m), the electronic device 100 according to certain embodiments of the disclosure may display the screen 1001 as a first screen illustrated in FIG. 8b, and based on the movement of the user 309 in a direction ② which is detected based on at least one image, if the distance d is longer than or equal to the preset distance (e.g., 5 m), the electronic device 100 according to certain embodiments of the disclosure may change the displayed screen 1001 as a second screen illustrated in FIG. 8c (e.g., so that a length of an arc of an area where a screen is displayed is longer than r) to display the changed screen.

If the distance d is longer than or equal to the preset distance (e.g., 5 m), the electronic device 100 according to certain embodiments of the disclosure may display the screen 1001 as the second screen illustrated in FIG. 8c, and based on the movement of the user 309 in a direction ① which is detected based on the at least one image, if the distance d is shorter than the preset distance (e.g., 5 m), the electronic device 100 according to certain embodiments of the disclosure may change the displayed screen 1001 as the first screen illustrated in FIG. 8b (e.g., so that a length of an arc of an area where a screen is displayed is shorter than r) to display the changed screen.

Figure 11A:
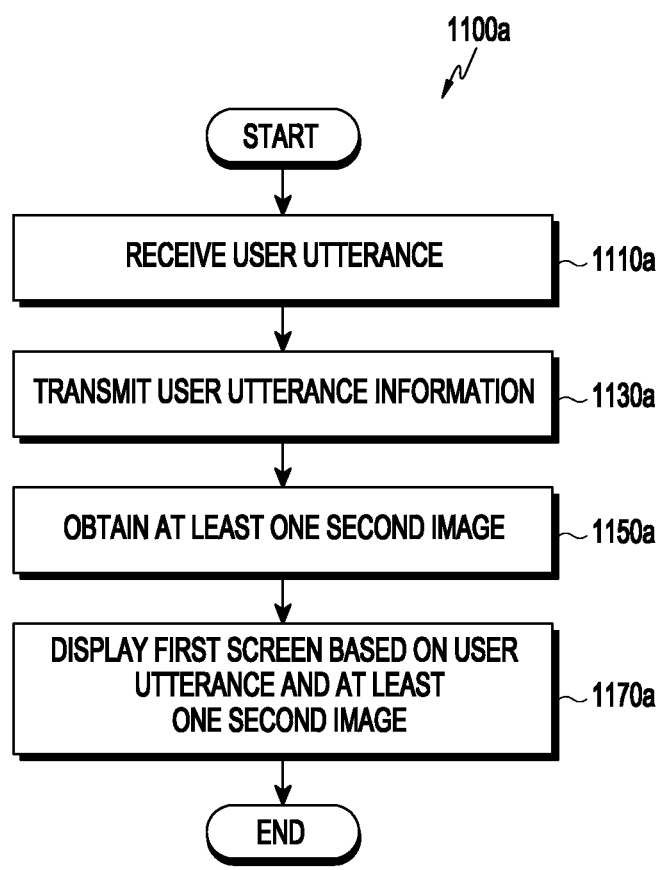
FIG. 11a is an example diagram describing an operation of displaying a first screen based on a distance where a user is located from an electronic device which is identified from a user utterance and at least one second image in the electronic device according to certain embodiments of the disclosure.
Figure 11B:
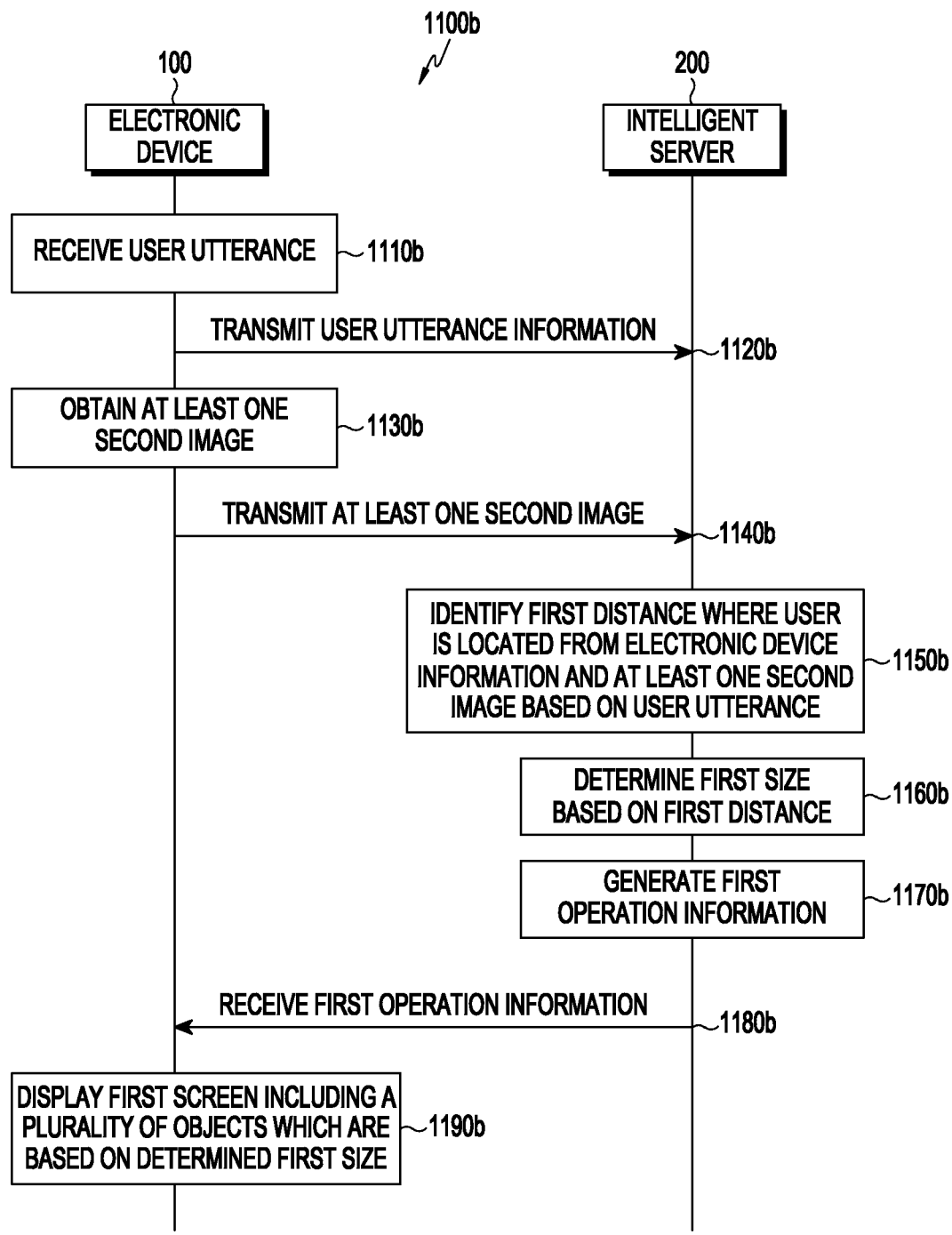
FIG. 11b is an example diagram describing an operation of displaying a first screen based on a distance where a user is located from an electronic device which is identified from a user utterance and at least one second image in the electronic device according to certain embodiments of the disclosure.

FIGS. 11a and 11b are example diagrams 1100a and 1100b for describing an operation of displaying a first screen based on a distance where a user is located from an electronic device 100 which is identified from a user utterance and at least one second image in the electronic device 100 according to certain embodiments of the disclosure.

Referring to FIG. 11a, an electronic device 100 according to certain embodiments of the disclosure may receive a user utterance in operation 1110a. The electronic device 100 according to certain embodiments of the disclosure may receive an utterance of a user through a microphone (e.g., a microphone 301 in FIG. 3).

The electronic device 100 according to certain embodiments of the disclosure may transmit user utterance information in operation 1130a. The electronic device 100 according to certain embodiments of the disclosure may transmit information about the utterance of the user to an intelligent server (e.g., an intelligent server 200 in FIG. 1) by using a communication circuit (e.g., a communication module 1790 in FIG. 17).

The electronic device 100 according to certain embodiments of the disclosure may obtain at least one second image in operation 1150a. The electronic device 100 according to certain embodiments of the disclosure may obtain the at least one second image through a camera (e.g., a camera 303 in FIG. 3).

In operation 1170a, the electronic device 100 according to certain embodiments of the disclosure may display a first screen based on the user utterance and the at least one second image. The electronic device 100 according to certain embodiments of the disclosure may display, on a display (e.g., a display 120 in FIG. 1), a plurality of objects with a first size which is determined based on the utterance of the user and the at least one second image.

Referring to FIG. 11b, an electronic device 100 according to certain embodiments of the disclosure may receive a user utterance in operation 1110b.

The electronic device 100 according to certain embodiments of the disclosure may transmit user utterance information to an intelligent server 200 in operation 1120b.

The electronic device 100 according to certain embodiments of the disclosure may obtain at least one second image in operation 1130b.

The electronic device 100 according to certain embodiments of the disclosure may transmit the at least one second image to the intelligent server 200 in operation 1140b.

In operation 1150b, the intelligent server 200 according to certain embodiments of the disclosure may identify a first distance between a user and the electronic device 100 based on the user utterance information and the at least one second image. The intelligent server 200 according to certain embodiments of the disclosure may identify at least one of a signal gain or delay information of the user utterance from the user utterance information, and identify the first distance where the user is located from the electronic device 100 by performing an object recognition operation (e.g., an operation of recognizing a size of a face of the user included in the at least one second image) on the at least one second image.

The intelligent server 200 according to certain embodiments of the disclosure may determine a first size based on the first distance in operation 1160b. The first size according to certain embodiments of the disclosure may be a size of a plurality of objects to be displayed on the display of the electronic device 100 (e.g., the display 120 in FIG. 1). The first size according to certain embodiments of the disclosure may be determined by comparing the first distance with a preset distance (e.g., 5 m), it has been described above in the previous drawings, so a redundant description will be omitted.

The intelligent server 200 according to certain embodiments of the disclosure may generate first operation information in operation 1170b.

The electronic device 100 according to certain embodiments of the disclosure may receive the first operation information from the intelligent server 200 in operation 1180b.

The electronic device 100 according to certain embodiments of the disclosure may display a first screen including a plurality of objects which are based on the determined first size in operation 1190b. For example, if the first size corresponds to a first size which is described above with reference to FIG. 8b, the electronic device 100 according to certain embodiments of the disclosure may display the plurality of objects as illustrated in FIG. 8b. If the first size corresponds to a second size described above with reference to FIG. 8c, the electronic device 100 according to certain embodiments of the disclosure may display the plurality of objects as illustrated in FIG. 8c.

Figure 12A:
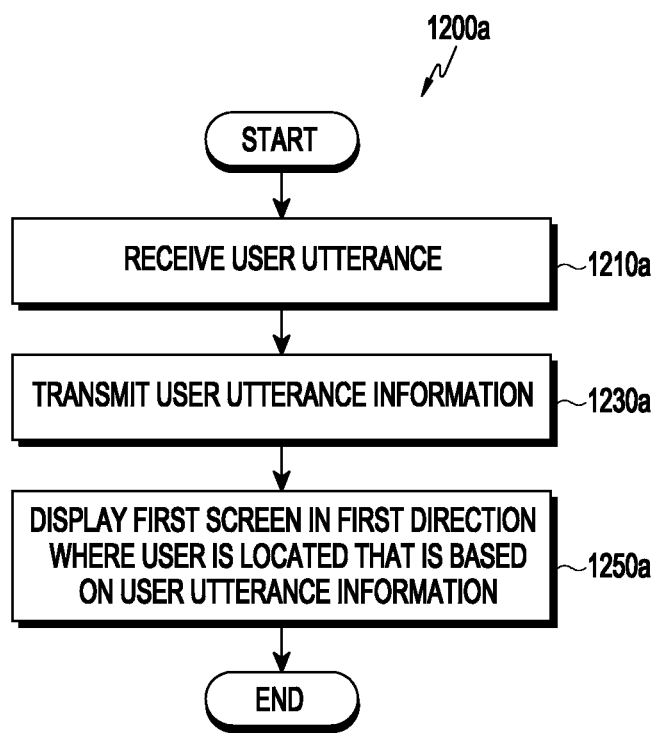
FIG. 12a is an example diagram for describing an operation of displaying a screen in a direction where a user is located in an electronic device according to certain embodiments of the disclosure.
Figure 12B:
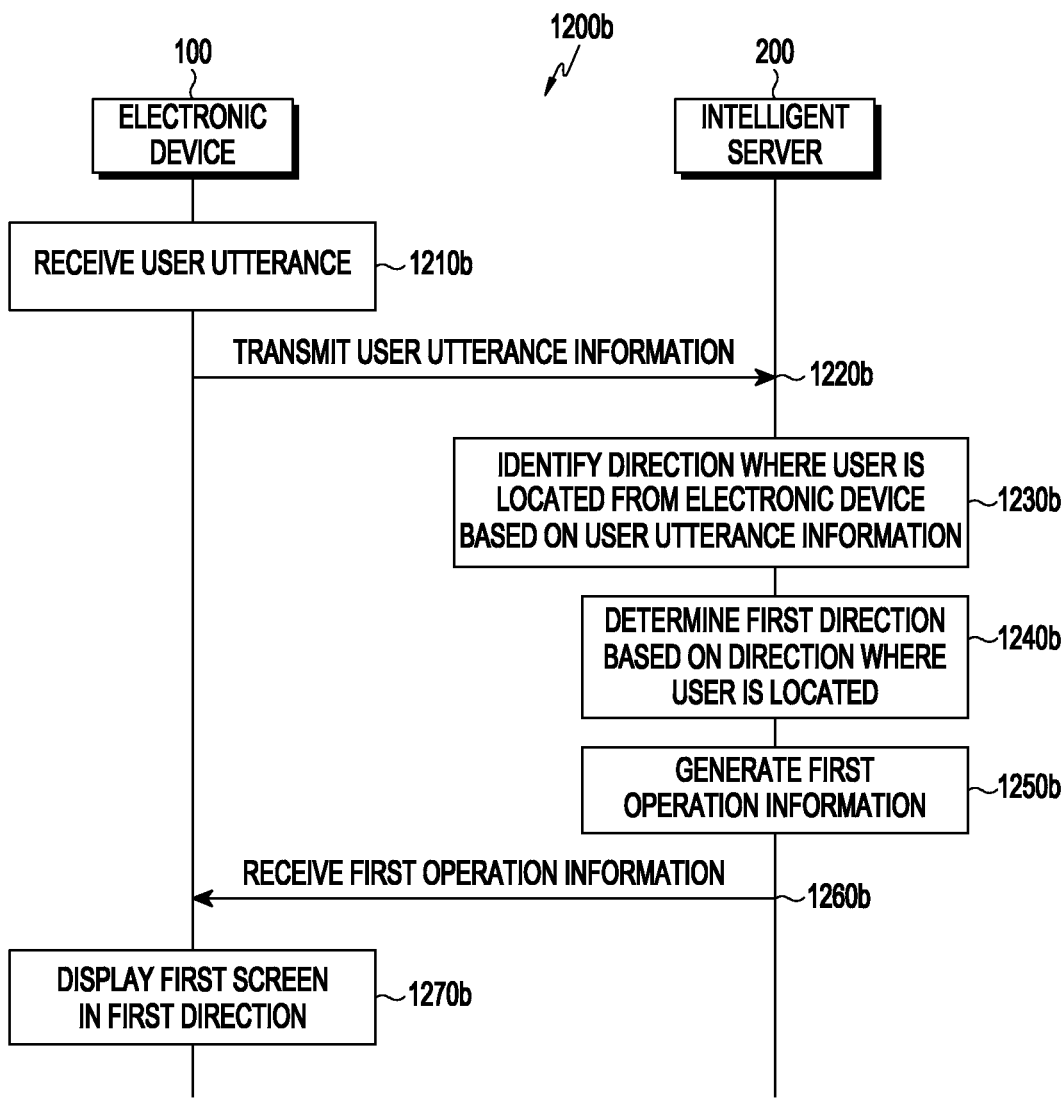
FIG. 12b is an example diagram for describing an operation of displaying a screen in a direction where a user is located in an electronic device according to certain embodiments of the disclosure.

FIGS. 12a and 12b are example diagrams 1200a and 1200b for describing an operation of displaying a screen in a direction where a user is located in an electronic device according to certain embodiments of the disclosure.

Referring to FIG. 12a, an electronic device 100 according to certain embodiments of the disclosure may receive a user utterance in operation 1210a. The electronic device 100 according to certain embodiments of the disclosure may receive an utterance of a user through a microphone (e.g., a microphone 301 in FIG. 3).

The electronic device 100 according to certain embodiments of the disclosure may transmit user utterance information in operation 1230*a*. The electronic device 100 according to certain embodiments of the disclosure may transmit the user utterance information to an intelligent server (e.g., an intelligent server 200 in FIG. 1) by using a communication circuit (e.g., a communication module 1790 in FIG. 17).

The electronic device 100 according to certain embodiments of the disclosure may display a first screen in a first direction where a user is located which is based on the user utterance information in operation 1250*a*. The first direction according to certain embodiments of the disclosure may be a direction which corresponds to the direction (e.g., the same or neighboring direction) where the user is located from the electronic device 100.

Referring to FIG. 12*b*, an electronic device 100 according to certain embodiments of the disclosure may receive a user utterance in operation 1210*b*.

The electronic device 100 according to certain embodiments of the disclosure may transmit user utterance information to an intelligent server 200 in operation 1220*b*. The user utterance information according to certain embodiments of the disclosure may include at least one of a signal gain or delay information of the user utterance received through a directional microphone of the electronic device 100.

The intelligent server 200 according to certain embodiments of the disclosure may identify a direction where a user is located from the electronic device 100 based on the user utterance information in operation 1230*b*. The intelligent server 200 according to certain embodiments of the disclosure may identify the direction where the user is located from the electronic device 100 based on at least one of the signal gain or delay information of the received user utterance.

The intelligent server 200 according to certain embodiments of the disclosure may determine a first direction based on the direction where the user is located in operation 1240*b*. The first direction according to certain embodiments of the disclosure may include a direction which coincides with or is close to the direction where the user is located from the electronic device 100.

The intelligent server 200 according to certain embodiments of the disclosure may generate first operation information in operation 1250*b*. The first operation information according to certain embodiments of the disclosure may include a pass rule (e.g., a pass rule in FIG. 5) generated from voice data for the user utterance.

The electronic device 100 according to certain embodiments of the disclosure may receive the first operation information from the intelligent server 200 in operation 1260*b*. The electronic device 100 according to certain embodiments of the disclosure may also receive, from the intelligent server 200, information about a direction where a plurality of objects is displayed on a display of the electronic device 100 (e.g., a display 120 in FIG. 1).

The electronic device 100 according to certain embodiments of the disclosure may display a first screen in the first direction in operation 1270*b*. The electronic device 100 according to certain embodiments of the disclosure may display the first screen including the plurality of objects on the display (e.g., the display 120 in FIG. 1) in the first direction.

Figure 13:
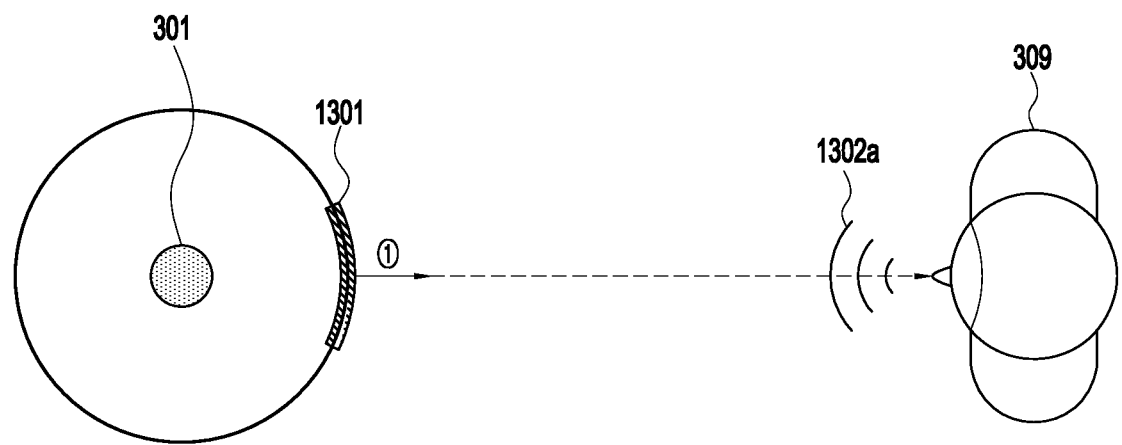
FIG. 13 is an example diagram for describing an operation of displaying a screen in a direction where a user is located in an electronic device according to certain embodiments of the disclosure.

FIG. 13 is an example diagram for describing an operation of displaying a screen in a direction where a user is located in an electronic device according to certain embodiments of the disclosure.

Referring to FIG. 13, an electronic device 100 according to certain embodiments of the disclosure may receive, from an intelligent server (e.g., an intelligent server in FIG. 2), first operation information and information (e.g., information about a direction where a plurality of objects are displayed) about a first screen 1301 in response to an operation of transmitting, to the intelligent server (e.g., the intelligent server in FIG. 2), voice data which corresponds to a user utterance 1302*a* received from a user 309.

The electronic device 100 according to certain embodiments of the disclosure may execute a designated application (e.g., a weather application) according to the user utterance based on the first operation information, and display a first screen 1301 of the application on a display 120.

The electronic device 100 according to certain embodiments of the disclosure may display, on the display 120, the first screen 1301 in a first direction ① based on the information (e.g., the information about the direction where the plurality of objects are displayed) about the first screen 1301.

The electronic device 100 according to certain embodiments of the disclosure, as described above with reference to FIGS. 8*b* and 8*c*, may display the first screen 1301 by varying a size, an arrangement, the number, and a size of an area of the plurality of objects being displayed on the display 120 according to a distance d where the user 309 is located from the electronic device 100.

Figure 14A:
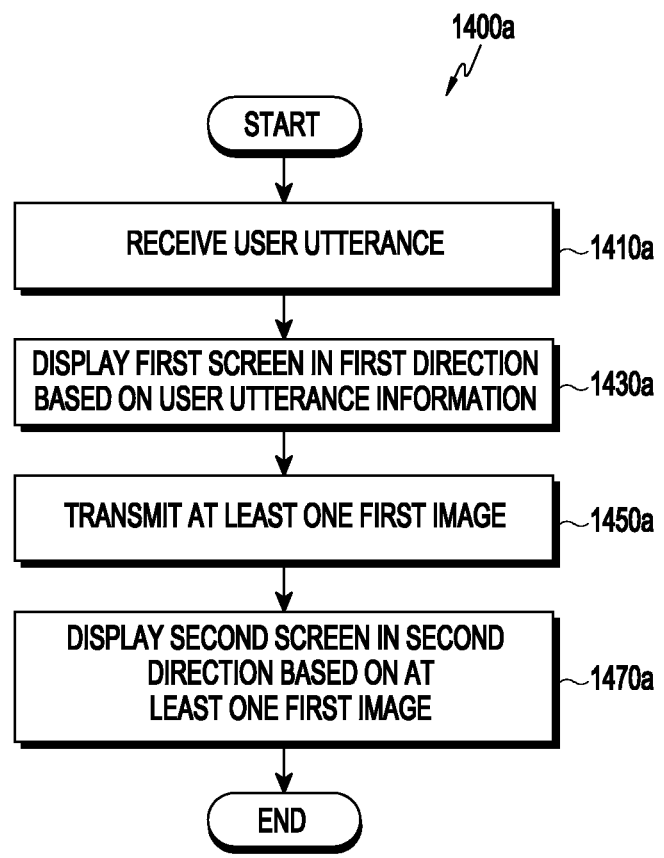
FIG. 14a is an example diagram for describing an operation of displaying a screen in a direction where a user moves in an electronic device according to certain embodiments of the disclosure.
Figure 14B:
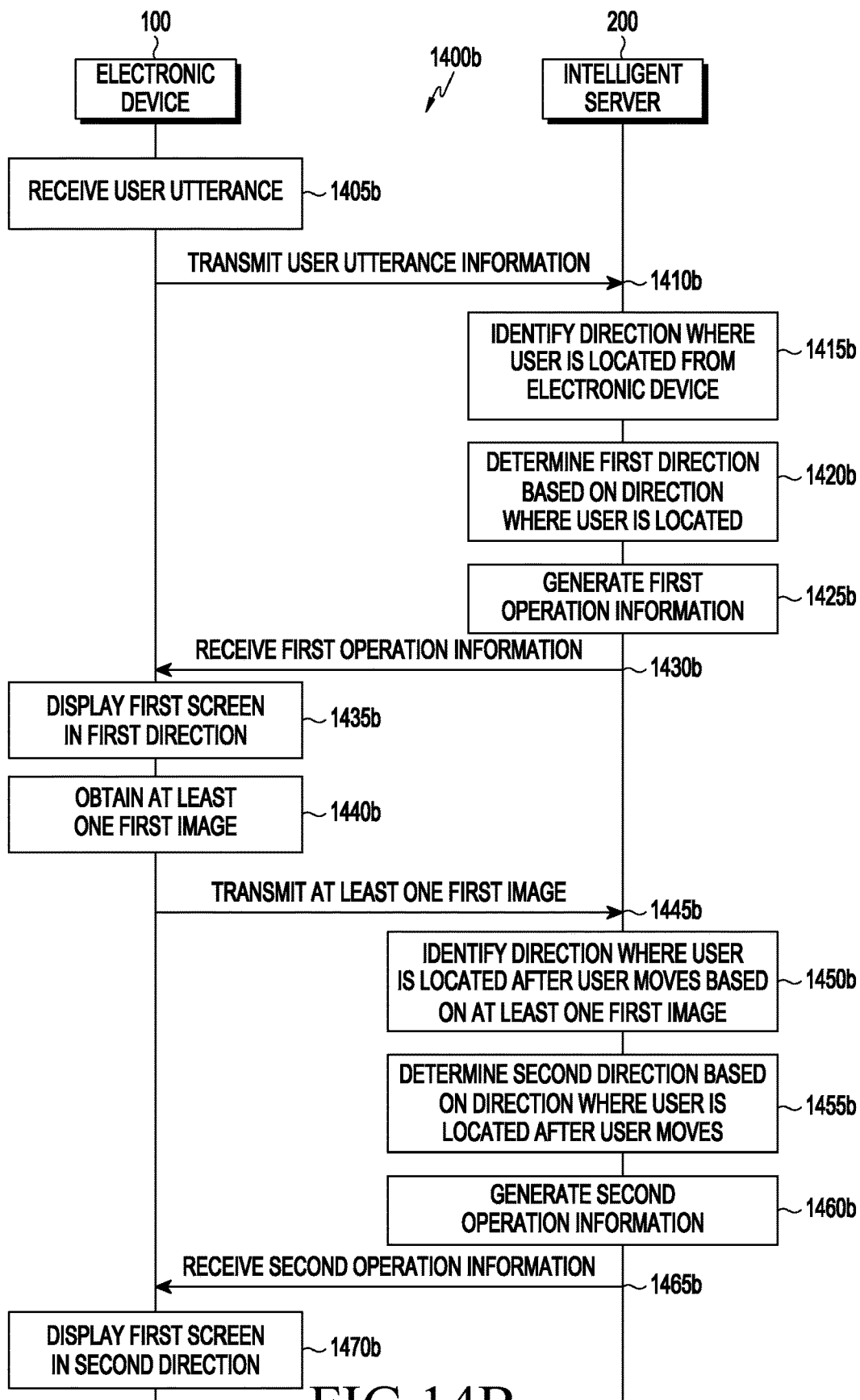
FIG. 14b is an example diagram for describing an operation of displaying a screen in a direction where a user moves in an electronic device according to certain embodiments of the disclosure.

FIGS. 14*a* and 14*b* are example diagrams 1400*a* and 1400*b* for describing an operation of displaying a screen in a direction where a user moves in an electronic device (e.g., an electronic device 100 in FIG. 1) according to certain embodiments of the disclosure.

Referring to FIG. 14*a*, an electronic device 100 according to certain embodiments of the disclosure may receive a user utterance in operation 1410*a*. The electronic device 100 according to certain embodiments of the disclosure may receive the user utterance from a user through a microphone (e.g., a microphone 301 in FIG. 3).

The electronic device 100 according to certain embodiments of the disclosure may display a first screen in a first direction based on user utterance information in operation 1430*a*. The electronic device 100 according to certain embodiments of the disclosure, as described above with reference to FIG. 12*a*, FIG. 12*b*, or FIG. 13, may display, on a display (e.g., a display 120 in FIG. 1), the first screen (e.g., a screen including a plurality of objects) in the first direction based on the user utterance information.

The electronic device 100 according to certain embodiments of the disclosure may transmit at least one first image in operation 1450*a*. The electronic device 100 according to certain embodiments of the disclosure may obtain the at least one first image through a camera (e.g., a camera 303 in FIG. 1), and transmit, to an intelligent server (e.g., an intelligent server 200 in FIG. 1), the obtained at least one first image.

In operation 1470*a*, the electronic device 100 according to certain embodiments of the disclosure may display the first screen in a second direction (i.e., in other words, display a second screen) based on the at least one first image. The electronic device 100 according to certain embodiments of the disclosure may receive, from the intelligent server (e.g., the intelligent server 200 in FIG. 1), information about the first screen (e.g., information about a direction where a user is located from the electronic device 100) which is identified based on the at least one first image. An operation of identifying the direction where the user is located based on the at least one first image according to certain embodiments of the disclosure may be performed by an operation (e.g., an operation of identifying movement (moving) of an object) of recognizing an object (e.g., a face of the user) within an image which is based on a deep learning technology, or may be performed by various other technologies. The electronic device 100 according to certain embodiments of the disclosure may display the first screen in the second direction changed from the first direction (that is, display the second screen) based on received information about the second screen.

Referring to FIG. 14*b*, the same description as described above in operations 1210*b* to 1270*b* in FIG. 12*b* may be applied to operations 1405*b* to 1435*b* performed by an electronic device 100 or an intelligent server 200 according to certain embodiments of the disclosure, respectively.

The electronic device 100 according to certain embodiments of the disclosure may obtain at least one first image in operation 1440*b*. The electronic device 100 according to certain embodiments of the disclosure may obtain the at least one first image through a camera (e.g., a camera 303 in FIG. 3).

The electronic device 100 according to certain embodiments of the disclosure may transmit the at least one first image to the intelligent server 200 in operation 1445*b*.

In operation 1450*b*, the intelligent server 200 according to certain embodiments of the disclosure may identify a direction in which a user is located relative to the device 100, after the user moves based on the at least one first image. The intelligent server 200 according to certain embodiments of the disclosure may identity the direction where the user is located from the electronic device 100 after the user moves by performing an operation (e.g., an operation of identifying motion (moving) of an object) of recognizing an object (e.g., a face of the user) within an image based on a deep learning technology.

In operation 1455*b*, the intelligent server 200 according to certain embodiments of the disclosure may determine a second direction based on the direction in which the user is located after the movement of the user. The second direction according to certain embodiments of the disclosure may mean a direction where a plurality of objects is displayed on a display (e.g., a display 120 in FIG. 1). The second direction according to certain embodiments of the disclosure may include a direction which coincides with or is close to a direction where the user is located from the electronic device 100.

The intelligent server 200 according to certain embodiments of the disclosure may generate second operation information in operation 1460*b*. The second operation information according to certain embodiments of the disclosure may include a pass rule (e.g., a pass rule in FIG. 5) generated from the at least one first image. The second operation information according to certain embodiments of the disclosure may include an operation of changing a direction where a first screen is displayed and displaying the first screen in the changed direction.

The electronic device 100 according to certain embodiments of the disclosure may receive the second operation information from the intelligent server 200 in operation 1465*b*. The electronic device 100 according to certain embodiments of the disclosure may also receive second screen information (e.g., information about the changed display direction of the first screen) from the intelligent server 200.

The electronic device 100 according to certain embodiments of the disclosure may display the first screen in the second direction in operation 1470*b*. The electronic device 100 according to certain embodiments of the disclosure may display a plurality of objects on the display (e.g., the display 120 in FIG. 2) in the determined direction (e.g., the second direction). If the distance where the user is located from the electronic device 100 also changes, the electronic device 100 according to certain embodiments of the disclosure, as described above with reference to FIGS. 8*b* and 8*c*, may display the plurality of objects by varying at least one of a size of the plurality of objects, a size (or an arc length) of an area where a screen is displayed, the number of the plurality of objects displayed on the screen, or an arrangement of the plurality of objects.

Figure 15:
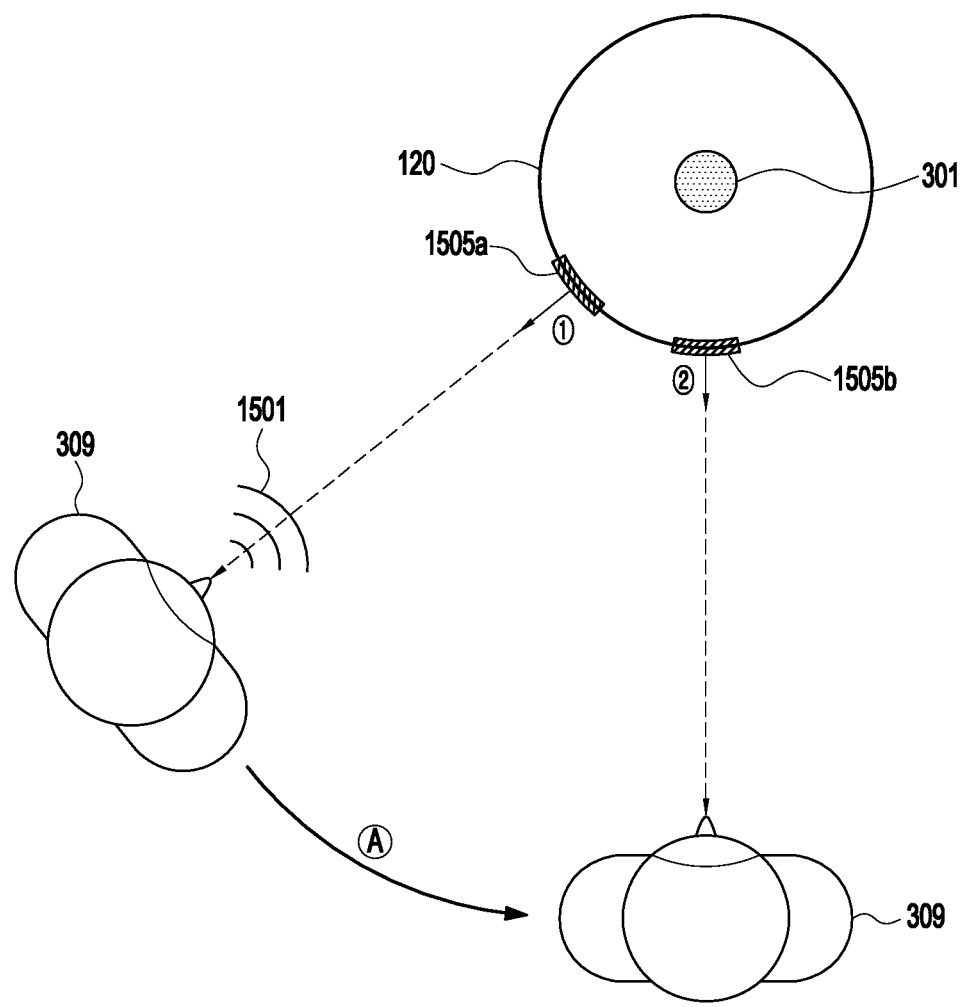
FIG. 15 is an example diagram for describing an operation of displaying a screen in a direction where a user moves in an electronic device according to certain embodiments of the disclosure.

Referring to FIG. 15, an electronic device 100 according to certain embodiments of the disclosure may receive, from an intelligent server (e.g., an intelligent server in FIG. 2), first operation information and information about a first screen 1505*a* (e.g., information about a direction where a plurality of objects are displayed) in response to an operation of transmitting, to the intelligent server (e.g., the intelligent server in FIG. 2), a user utterance 1501 received from a user 309 located at a first location.

The electronic device 100 according to certain embodiments of the disclosure may execute a designated application according to the user utterance based on the first operation information, and display, on a display 120, the first screen 1505*a* of the application in a first direction ①.

The electronic device 100 according to certain embodiments of the disclosure may obtain at least one first image obtained from a camera (e.g., a camera 303 in FIG. 3). The at least one first image according to certain embodiments of the disclosure may include an image for the user 309 located at a first location and an image for the user 309 who moves from the first location to a second location.

The electronic device 100 according to certain embodiments of the disclosure may receive, from the intelligent server (e.g., the intelligent server 200 in FIG. 2), second operation information and second screen information (information about a changed display direction (e.g., a second direction ②) of the first screen 1505*a*) in response to an operation of transmitting the at least one first image to the intelligent server (e.g., the intelligent server 200 in FIG. 2).

The electronic device 100 according to certain embodiments of the disclosure, based on the received information about the changed display direction (e.g., the second direction ②) of the first screen 1505*a*), may change the direction (e.g., the first direction ①) where the first screen 1505*a* is displayed to the second direction ② and display the first screen 1505*a* in the second direction ② (that is, display the second screen 1505*b*).

Figure 16:
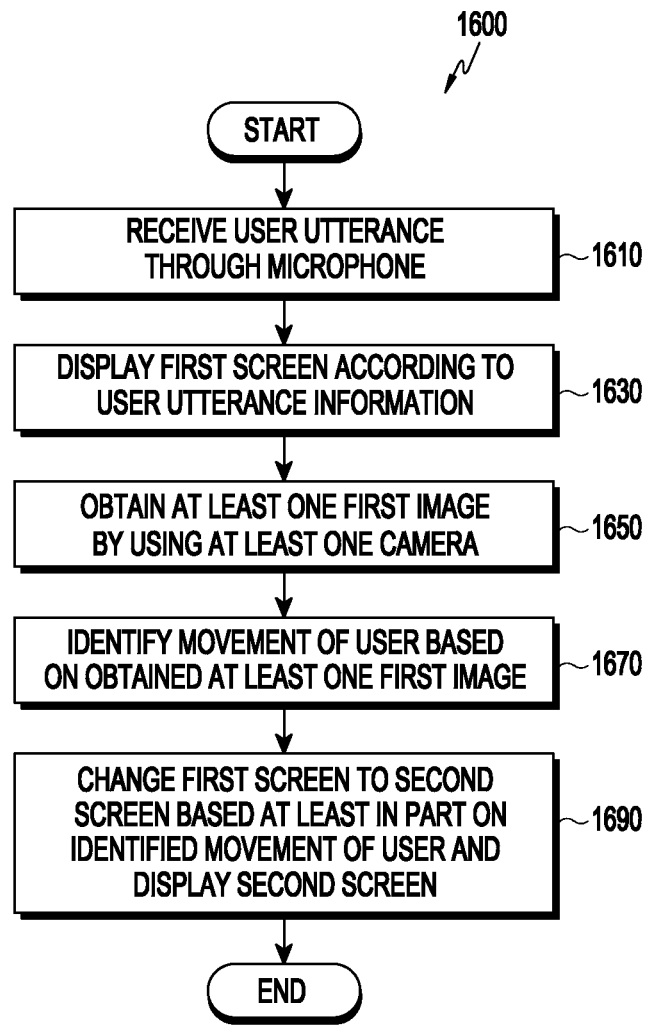
FIG. 16 is an example diagram for describing an operation of changing a first screen to a second screen to display the second screen in an electronic device according to certain embodiments of the disclosure.

FIG. 16 is an example diagram 1600 for describing an operation of changing a first screen to a second screen and displaying the second screen in an electronic device (e.g., an electronic device 100 in FIG. 1) according to certain embodiments of the disclosure.

Referring to FIG. 16, an electronic device (e.g., a processor 150 in FIG. 1) according to certain embodiments of the disclosure may receive a user utterance through a microphone (e.g., a microphone 301 in FIG. 3) in operation 1610. The user utterance according to certain embodiments of the disclosure may include, for example, a command for executing (or performing) a specific function (or task) by using a specific application.

The electronic device (e.g., the processor 150 in FIG. 1) according to certain embodiments of the disclosure may display a first screen according to the user utterance in operation 1630. The electronic device (e.g., the processor 150 in FIG. 1) according to certain embodiments of the disclosure may execute a first application which corresponds to the received user utterance, and display a first screen (a first execution screen) of the first application on a display. The first screen according to certain embodiments of the disclosure may include a plurality of objects.

The electronic device 100 according to certain embodiments of the disclosure may identify first location information based on at least one of a gain or delay information of an electrical signal which is converted from the user utterance by the microphone 301. The first location information according to certain embodiments of the disclosure may include at least one of a distance (a first distance) or a direction (a first direction) where a user is located from the electronic device 100.

The plurality of objects included in the first screen according to certain embodiments of the disclosure may be displayed on a display (e.g., a display 120 in FIG. 1) with a size which is based on the first location information. The size based on the first location information according to certain embodiments of the disclosure may be determined according to a distance where a user is located from the electronic device 100 which is identified based on a magnitude (strength) of the received user utterance. For example, the size of the plurality of objects according to certain embodiments of the disclosure may be determined as a first size if the distance where the user is located from the electronic device 100 is longer than a preset distance (e.g., 5 m), and may be determined as a second size which is smaller than the first size if the distance where the user is located from the electronic device 100 is shorter than the preset distance (e.g., 5 m).

The number of the plurality of objects included in the first screen according to certain embodiments of the disclosure may be determined according to the distance where the user is located from the electronic device 100 which is identified based on the magnitude (strength) of the received user utterance. For example, the number of the plurality of objects included in the first screen according to certain embodiments of the disclosure may be determined as a first number (e.g., 2) if the distance where the user is located from the electronic device 100 is longer than the preset distance (e.g., 5 m), and may be determined as a second number (e.g., 10) which is greater than the first number if the distance where the user is located from the electronic device 100 is shorter than the preset distance (e.g., 5 m).

A size of an area where the first screen is displayed according to certain embodiments of the disclosure may be determined according to the distance where the user is located from the electronic device 100 which is identified based on the magnitude (strength) of the received user utterance. For example, the area where the first screen is displayed according to certain embodiments of the disclosure may be determined as an area of a first size if the distance where the user is located from the electronic device 100 is longer than the preset distance (e.g., 5 m), and may be determined as an area of a second size smaller than the first size if the distance where the user is located from the electronic device 100 is shorter than the preset distance (e.g., 5 m).

A method for the electronic device (e.g., the processor 150 in FIG. 1) to identify the first location information in the above-described operation 1630 may be performed by performing object recognition on at least one image obtained through a camera (e.g., a camera 303 in FIG. 3) in addition to a method which is based on a user utterance. More specifically, the electronic device 100 according to certain embodiments of the disclosure may determine the direction where the first screen is displayed, the size of the area where the first screen is displayed, the size of the plurality of objects included in the first screen, or the number of the plurality of objects by identifying at least one of the distance or the direction where the user is located from the electronic device 100 from the at least one image.

In operation 1650, the electronic device (e.g., the processor 150 in FIG. 1) according to certain embodiments of the disclosure may obtain at least one first image by using at least one camera (e.g., the camera 303 in FIG. 3). A first image according to certain embodiments of the disclosure may include an image for user who transmits the user utterance.

In operation 1670, the electronic device (e.g., the processor 150 in FIG. 1) according to certain embodiments of the disclosure may identify movement of the user based on the obtained at least one first image. An operation of identifying the movement of the user in the electronic device (e.g., the processor 150 in FIG. 1) according to certain embodiments of the disclosure may be performed by an operation of recognizing an object (e.g., a face of the user) within an image based on a deep learning technology, or may be performed by various other technologies. The electronic device (e.g., the processor 150 in FIG. 1) according to certain embodiments of the disclosure may identify second location information (e.g., information about at least one of a distance (a second distance) or a direction (a second direction) where the user is located from the electronic device 100) from the at least one first image. The electronic device 100 according to certain embodiments of the disclosure may identify the movement of the user by comparing the first location information and the second location information. The electronic device 100 according to certain embodiments of the disclosure may identify that at least one of a distance or a direction where the user is located from the electronic device 100 is changed as a result of comparing the first location information and the second location information.

In operation 1690, the electronic device (e.g., the processor 150 in FIG. 1) according to certain embodiments of the disclosure may change the first screen to the second screen based at least in part on the identified movement of the user and display the second screen. Here, the second screen is a second execution screen of the first application, and may mean a screen in which at least one of a direction displayed on the display (e.g., the display 120 in FIG. 1), the number of the plurality of objects, or the size of the plurality of objects in the displayed first screen is changed.

If the distance where the user is located from the electronic device 100 is changed from the first distance to the second distance according to the movement of the user, the electronic device (e.g., the processor 150 in FIG. 1) according to certain embodiments of the disclosure may display a second screen including a plurality of objects, and at least one of the number or a size of the plurality of objects included in the second screen is different from at least one of the number or a size of the plurality of objects included in the first screen. A detailed description in this regard has already been described with reference to FIGS. 8b and 8c, and thus redundant content will be omitted.

If the direction where the user is located from the electronic device 100 is changed from the first direction to the second direction according to the movement of the user, the electronic device (e.g., the processor 150 in FIG. 1) according to certain embodiments of the disclosure may change a direction where the first screen is displayed corresponding to the second direction to display the second screen. A detailed description in this regard has already been described with reference to FIGS. 8b and 8c, and thus redundant content will be omitted.

FIG. 17 is a block diagram illustrating an electronic device 1701 in a network environment 1700 according to certain embodiments. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In some embodiments, at least one (e.g., the display device 1760 or the camera module 1780) of the components may be omitted from the electronic device 1701, or one or more other components may be added in the electronic device 1701. In some embodiments, some of the components may be implemented as single integrated circuitry. For example, the sensor module 1776 (e.g., a fingerprint sensor, an iris sensor, or an illuminance sensor) may be implemented as embedded in the display device 1760 (e.g., a display).

The processor 1720 may execute, for example, software (e.g., a program 1740) to control at least one other component (e.g., a hardware or software component) of the electronic device 1701 coupled with the processor 1720, and may perform various data processing or computation. According to an embodiment, as at least part of the data processing or computation, the processor 1720 may load a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thererto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by other component (e.g., the processor 1720) of the electronic device 1701, from the outside (e.g., a user) of the electronic device 1701. The input device 1750 may include, for example, a microphone, a mouse, a keyboard, or a digital pen (e.g., a stylus pen).

The sound output device 1755 may output sound signals to the outside of the electronic device 1701. The sound output device 1755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to an embodiment, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to an embodiment, the audio module 1770 may obtain the sound via the input device 1750, or output the sound via the sound output device 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly.

According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to an embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or infrared data association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. According to an embodiment, the antenna module 1797 may include an antenna including a radiating element implemented using a conductive material or a conductive pattern formed in or on a substrate (e.g., PCB). According to an embodiment, the antenna module 1797 may include a plurality of antennas. In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

According to certain embodiments of the disclosure, an electronic device may include a display, at least one camera, at least one microphone, a communication circuit, at least one processor which is a part of the electronic device or remotely communicating with the electronic device, and a memory which is located on the electronic device or outside the electronic device, and operably connected to the at least one processor, the memory may be configured to store instructions that, when executed, cause the at least one processor to: receive an utterance of a user via the at least one microphone, obtain a first image using the at least one camera, transmit, to a server using the communication circuit, utterance information corresponding to the received utterance of the user and the first image, and receive, from the server by using the communication circuit, operational information identified based on the utterance information and the first image, and execute a task according to the received operational information, the operational information may cause the at least one processor to: display a first screen on the display, the first screen including a first plurality of objects which are displayed based on a first size, and change the first screen to a second screen based at least in part on movement of the user identified based on the first image, the movement requesting display of the second screen, and the second screen may include a second plurality of objects based on a second size different from the first size, and a count of the second plurality of objects may be different from a count of the first plurality of objects.

According to certain embodiments of the disclosure, the operational information may further cause the at least one processor to: execute a first application based on the utterance of the user, and receive, from the server, display information for display of the first screen on the display.

According to certain embodiments of the disclosure, the first size may be determined based on a gain magnitude of the utterance of the user, and the gain magnitude is identified by the server.

According to certain embodiments of the disclosure, the first image may be obtained after displaying the first screen, and the first image may be transmitted to the server using the communication circuit.

According to certain embodiments of the disclosure, the instructions, when executed, may further cause the at least one processor to: obtain a second image via the at least one camera, after receiving the utterance of the user via the at least one microphone, and transmit the second image to the server by using the communication circuit.

According to certain embodiments of the disclosure, the first size may be determined based on a first distance between the user and the electronic device, which is identified using the at least one second image.

According to certain embodiments of the disclosure, the second size may be determined based on a second distance between the user and the electronic device, which is set according to the identified movement of the user.

According to certain embodiments of the disclosure, the second plurality of objects displayed on the second screen may include at least some objects of the first plurality of objects displayed on the first screen.

According to certain embodiments of the disclosure, the at least some objects may be enlarged to the second size larger than the first size when displayed on the second screen.

According to certain embodiments of the disclosure, the second plurality of objects displayed on the second screen may include the first plurality of objects displayed on the first screen and at least one new object related to the plurality of objects displayed on the first screen.

According to certain embodiments of the disclosure, the second size may be smaller than the first size.

According to certain embodiments of the disclosure, the first screen is displayed on the display biased towards a first direction, and the first direction may be determined using an input received via the at least one microphone.

According to certain embodiments of the disclosure, the operational information may further cause the at least one processor to display the second screen on the display in a second direction, and the second direction may correspond to a direction in which the user is disposed relative to the electronic device, and may be identified based on the first image.

According to certain embodiments of the disclosure, the first screen may be displayed in a first area on the display, the second screen may be displayed in a second area on the display different from the first area, and each of the first area and the second area may be determined based on at least one of the utterance information or the first image.

According to certain embodiments of the disclosure, at least one of a size, a direction, and a height of the first area and the second area on the display may be different from each other.

According to certain embodiments of the disclosure, the display may be a cylindrical display whose at least a portion is exposed from the electronic device in a curved state according to a designated curvature, and curved surface distortion correction may be applied such that the at least one of the first screen and the second screen is viewed as a flat surface to the user.

According to certain embodiments of the disclosure, a method of controlling an electronic device may comprise: receiving an utterance of a user via at least one microphone, transmitting, to a server using a communication circuit, utterance information corresponding to the received utterance of the user, displaying a first screen on a display, the first screen including a first plurality of objects which are displayed based on a first size, obtaining a first image using at least one camera, transmitting the first image to the server, and changing the first screen to a second screen based at least in part on a movement of the user identified by the server based on the first image, the movement requesting display of the second screen, and the second screen may include a second plurality of objects which are displayed based on a second size different from the first size.

According to certain embodiments of the disclosure, an electronic device may include a display, at least one camera, at least one microphone, a communication circuit, at least one processor which is a part of the electronic device or remotely communicating with the electronic device, and a memory which is located on the electronic device or outside the electronic device and operably connected to the at least one processor, the memory may be configured to store instructions that, when executed, cause the at least one processor to: receive an utterance of a user via the at least one microphone, display a first screen on the display according to the received utterance of the user, the first screen including a first plurality of objects which are displayed based on a first size, obtain at least one first image using the at least one camera, identify movement of the user based on the obtained at least one first image, and change the first screen to a second screen based at least in part on the identified movement of the user to display the second screen, and the second screen may include a second plurality of objects which are displayed based on a second size different from the first size.

According to certain embodiments of the disclosure, the instructions may cause the at least one processor to: identify first location information of the user for the electronic device based on the received utterance of the user, the first location information including information about at least one of a first distance or a first direction where the user is located from the electronic device, and display the first screen in a first area which corresponds to the first location information.

According to certain embodiments of the disclosure, the instructions may cause the at least one processor to: identify that the user moves from a first distance to a second distance from the electronic device based on the identified movement of the user, in case that the second distance is longer than the first distance, display a plurality of objects displayed on the second screen in the second size greater than the first size, and in case that the second distance is shorter than the first distance, display the plurality of objects displayed on the second screen in the second size smaller than the first size.

According to certain embodiments of the disclosure, the instructions may cause the at least one processor to: identify that the user moves from the first distance to the second distance from the electronic device based on the identified movement of the user, in case that the second distance is longer than the first distance, display the plurality of objects displayed on the second screen such that the plurality of objects displayed on the second screen includes at least some of a plurality of objects displayed on the first screen, and in case that the second distance is shorter than the first distance, display the plurality of objects displayed on the second screen such that the plurality of objects displayed on the second screen includes the plurality of objects displayed on the first screen and at least one object related to the plurality of objects displayed on the first screen.

According to certain embodiments of the disclosure, the instructions may cause the at least one processor to: identify second location information of the user for the electronic device based on the at least one first image, the second location information including information about at least one of a second distance or a second direction where the user is located from the electronic device, and display the second screen in a second area which corresponds to the second location information.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a cylinder shaped display implemented in a cylindrical shape bent according to a specified curvature, and at least partially exposed from the electronic device;
   at least one camera;
   at least one microphone;
   at least one speaker;
   a communication circuit;

at least one processor which is a part of the electronic device, or remotely communicating with the electronic device; and a memory which is located on the electronic device or outside the electronic device, and operably connected to the at least one processor, wherein the memory is configured to store instructions that, when executed by the at least one processor, cause the electronic device to:

receive an utterance of a user via the at least one microphone, transmit, to a server by using the communication circuit, utterance information corresponding to the utterance of the user, and receive, from the server by using the communication circuit, a first operational information identified based on the utterance of the user, and execute a task according to the first operational information, wherein the first operational information causes the electronic device to:

display a first screen related to a first function corresponding to utterance of the user on a first display area corresponding to a first arc facing the user among the cylinder shaped display, wherein the first screen includes a first plurality of objects which are displayed based on a first size, wherein the first size is based on a first distance between the electronic device and the user determined by the utterance of the user, obtain a first image capturing the user using the at least one camera while the task is executed according to the first operational information, transmit, to the server by using the communication circuit, the first image, receive, from the server by using the communication circuit, a second operational information identified based on the first image, and execute a task according to the second operational information, wherein the second operational information causes the electronic device to:

change the first screen to a second screen and display the second screen on a second display area corresponding to a second arc facing the user among the cylinder shaped display, wherein the second screen is related to the first function and includes a second plurality of objects which are displayed based on a second size, wherein the second size is based on a second distance between the electronic device and the user determined by the first image, the second display area corresponding to a location of the user determined by the first image, wherein, when the second distance is longer than the first distance, a length of the second arc of the second display area in the cylinder shaped display is longer than a length of the first arc of the first display area in the cylinder shaped display, some of the plurality of objects displayed in the first screen are omitted while displaying the second screen, and the omitted objects are output as a voice form through the at least one speaker.

2. The electronic device of claim 1, wherein the operational information further causes the electronic device to:

execute a first application based on the utterance of the user, and receive, from the server, display information for displaying the first screen related to the first application.

3. The electronic device of claim 2, wherein the first distance is determined based on a gain magnitude of the utterance of the user, and wherein the gain magnitude is identified by the server.

4. The electronic device of claim 1, wherein the instructions, when executed, further cause the electronic device to:

obtain a second image via the at least one camera, after receiving the utterance of the user via the at least one microphone, and transmit the second image to the server using the communication circuit.

5. The electronic device of claim 4, wherein the first size is determined based on the first distance between the user and the electronic device, which is identified further based on the second image.

6. The electronic device of claim 1, wherein the second size is determined based on the second distance between the user and the electronic device, which is identified movement of the user using the first image.

7. The electronic device of claim 1, wherein the second plurality of objects displayed on the second screen include at least some objects of the first plurality of objects displayed on the first screen.

8. The electronic device of claim 7, wherein, when the second distance is longer than the first distance, the at least some objects included in the second screen are enlarged to the second size larger than the first size.

9. The electronic device of claim 1, wherein the second plurality of objects displayed on the second screen include the first plurality of objects displayed on the first screen and at least one new object related to the plurality of objects displayed on the first screen.

10. A method of controlling an electronic device including a cylinder shaped display implemented in a cylindrical shape bent according to a specified curvature, and at least partially exposed from the electronic device, the method comprising:

receiving an utterance of a user via at least one microphone of the electronic device;

transmitting, to a server using a communication circuit of the electronic device, utterance information corresponding to the utterance of the user;

receiving, from the server by using the communication circuit, a first operational information identified based on the utterance of the user;

displaying a first screen related to a first function corresponding to utterance of the user on a first display area corresponding a first arc facing the user among the cylinder shaped display based on the first operational information, wherein the first screen includes a first plurality of objects which are displayed based on a first size, wherein the first size is based on a first distance between the electronic device and the user determined by the utterance of the user;

obtaining a first image capturing the user using at least one camera of the electronic device while displaying the first screen;

transmitting, using the communication circuit, the first image to the server;

receiving, from the server by using the communication circuit, a second operational information identified based on the first image; and changing the first screen to a second screen and displaying the second screen on a second display area corresponding to a second arc facing the user among the cylinder shaped display based on the second operational information, wherein the second screen is related to the first function and includes a second plurality of objects which are displayed based on a second size, wherein the second size is based on a second distance between the electronic device and the user determined by the first image, the second display area corresponding to a location of the user determined by the first image, wherein, when the second distance is longer than the first distance, a length of the second arc of the second display area in the cylinder shaped display is longer than a length of the first arc of the first display area in the cylinder shaped display, some of the plurality of objects displayed in the first screen are omitted while displaying the second screen, and the omitted objects are output as a voice form through at least one speaker of the electronic device.

11. The method of claim 10, further comprising:

executing a first application based on the utterance of the user, and receiving, from the server, display information for displaying the first screen related to the first application.

12. The method of claim 11, wherein the first distance is determined based on a gain magnitude of the utterance of the user, and wherein the gain magnitude is identified by the server.

13. The method of claim 10, further comprising:

obtaining a second image via the at least one camera, after receiving the utterance of the user via the at least one microphone, and transmitting the second image to the server using the communication circuit.

14. The method of claim 10, wherein the first size is determined based on the first distance between the user and the electronic device, which is identified further based on the second image.

* * * * *